United States Patent
Puteick et al.

(10) Patent No.: US 8,438,119 B2
(45) Date of Patent: May 7, 2013

(54) FOUNDATION LAYER FOR SERVICES BASED ENTERPRISE SOFTWARE ARCHITECTURE

(75) Inventors: Joachim Puteick, Ubstadt-Weiher (DE); Martin Rogge, Oestringen-Tiefenbach (DE); Hendrik Geipel, Walldorf (DE); Andrea Pluemper, Reichartshausen (DE); Andreas Huppert, Neulussheim (DE); Kai-Uwe Pielka, Reilingen (DE); Ashwin Reddy Yeddula, Walldorf (DE); Matthias Schmitt, Speyer (DE); Toralf Grossmann, Wiesloch (DE); Andreas Neumann, Walldorf (DE); Bare Said, St. Leon-Rot (DE); Stefan Miller, Hockenheim (DE); Michael Neumann, Speyer (DE); Florian Rehfeld, Heidelberg (DE); Ingo Bruss, Heidelberg (DE); Horst Schaude, Kraichtal (DE); Michael Bauer, Rastatt (DE); Andreas Morsch, Mannheim (DE); Silke Storch, Rauenberg (DE); Klaus Bahr, Karlsruhe (DE); Bernd Schmitt, Bruchsal (DE); Michael Meyringer, Rauenberg (DE); Dirk Henrich, Wiesloch (DE)

(73) Assignee: SAP AG, Walldorf (DE)

( * ) Notice: Subject to any disclaimer, the term of this patent is extended or adjusted under 35 U.S.C. 154(b) by 2011 days.

(21) Appl. No.: 11/396,252

(22) Filed: Mar. 30, 2006

(65) Prior Publication Data
US 2007/0233728 A1 Oct. 4, 2007

(51) Int. Cl.
*G06Q 10/00* (2006.01)
*G06F 12/00* (2006.01)
*G06F 19/00* (2011.01)

(52) U.S. Cl.
USPC .............. 705/348; 707/821; 700/95; 700/96; 700/106; 700/107; 700/112

(58) Field of Classification Search .................. 705/1.1, 705/348; 707/821–831; 700/95–117
See application file for complete search history.

(56) References Cited

U.S. PATENT DOCUMENTS

| 4,947,321 A | 8/1990 | Spence et al. |
| 5,361,198 A | 11/1994 | Harmon et al. |

(Continued)

FOREIGN PATENT DOCUMENTS

| WO | 00/23874 | 4/2000 |
| WO | 2004/083984 | 9/2004 |
| WO | 2005/114381 | 12/2005 |

OTHER PUBLICATIONS

Aleksy, M. et al.; "Interoperability of Java-Based Applications and SAP's Business Framework State of the Art and Desirable Developments"; Proceedings of the International Symposium on Edinburgh, UK; Sep. 1999; IEEE Computer Soc.; pp. 190-200.

(Continued)

*Primary Examiner* — Jami A Plucinski
*Assistant Examiner* — Fathi Abdelsalam
(74) *Attorney, Agent, or Firm* — Fish & Richardson P.C.

(57) ABSTRACT

Methods and apparatus, including systems and computer program products, for a services architecture design that provides enterprise services having foundation layer functionality at the level of an enterprise application. The design includes a set of service operations, process components, and optionally deployment units. Suitable business objects are also described.

10 Claims, 11 Drawing Sheets

U.S. PATENT DOCUMENTS

| | | |
|---|---|---|
| 5,550,734 A | 8/1996 | Tarter et al. |
| 5,560,005 A | 9/1996 | Hoover et al. |
| 5,566,097 A | 10/1996 | Myers et al. |
| 5,586,312 A | 12/1996 | Johnson et al. |
| 5,590,277 A | 12/1996 | Fuchs et al. |
| 5,632,022 A | 5/1997 | Warren et al. |
| 5,634,127 A | 5/1997 | Cloud et al. |
| 5,680,619 A | 10/1997 | Gudmundson et al. |
| 5,704,044 A | 12/1997 | Tarter et al. |
| 5,710,917 A | 1/1998 | Musa et al. |
| 5,768,119 A | 6/1998 | Havekost et al. |
| 5,822,585 A | 10/1998 | Nobel et al. |
| 5,832,218 A | 11/1998 | Gibbs et al. |
| 5,848,291 A | 12/1998 | Milne et al. |
| 5,867,495 A | 2/1999 | Elliott et al. |
| 5,870,588 A | 2/1999 | Rompaey et al. |
| 5,881,230 A | 3/1999 | Christensen et al. |
| 5,893,106 A | 4/1999 | Brobst et al. |
| 5,898,872 A | 4/1999 | Richley |
| 5,918,219 A | 6/1999 | Isherwood |
| 5,987,247 A | 11/1999 | Lau |
| 5,991,536 A | 11/1999 | Brodsky et al. |
| H1830 H | 1/2000 | Petrimoulx et al. |
| 6,028,997 A | 2/2000 | Leymann et al. |
| 6,038,393 A | 3/2000 | Iyengar et al. |
| 6,049,838 A | 4/2000 | Miller et al. |
| 6,067,559 A | 5/2000 | Allard et al. |
| 6,070,197 A | 5/2000 | Cobb et al. |
| 6,112,024 A | 8/2000 | Almond et al. |
| 6,151,582 A | 11/2000 | Huang et al. |
| 6,167,563 A | 12/2000 | Fontana et al. |
| 6,167,564 A | 12/2000 | Fontana et al. |
| 6,177,932 B1 | 1/2001 | Galdes et al. |
| 6,182,133 B1 | 1/2001 | Horvitz |
| 6,192,390 B1 | 2/2001 | Berger et al. |
| 6,208,345 B1 | 3/2001 | Sheard et al. |
| 6,237,136 B1 | 5/2001 | Sadhiro |
| 6,272,672 B1 | 8/2001 | Conway |
| 6,311,170 B1 | 10/2001 | Embrey |
| 6,338,097 B1 | 1/2002 | Krenzke et al. |
| 6,424,991 B1 | 7/2002 | Gish |
| 6,434,740 B1 | 8/2002 | Monday et al. |
| 6,442,748 B1 | 8/2002 | Bowman-Amuah |
| 6,445,782 B1 | 9/2002 | Elfe et al. |
| 6,446,045 B1 | 9/2002 | Stone et al. |
| 6,446,092 B1 | 9/2002 | Sutter |
| 6,473,794 B1 | 10/2002 | Guheen et al. |
| 6,493,716 B1 | 12/2002 | Azagury et al. |
| 6,571,220 B1 | 5/2003 | Ogino et al. |
| 6,594,535 B1 | 7/2003 | Constanza |
| 6,601,233 B1 | 7/2003 | Underwood |
| 6,601,234 B1 | 7/2003 | Bowman-Amuah |
| 6,606,744 B1 | 8/2003 | Mikurak |
| 6,609,100 B2 | 8/2003 | Smith et al. |
| 6,640,238 B1 | 10/2003 | Bowman-Amuah |
| 6,671,673 B1 | 12/2003 | Baseman et al. |
| 6,678,882 B1 | 1/2004 | Hurley et al. |
| 6,687,734 B1 | 2/2004 | Sellink et al. |
| 6,691,151 B1 | 2/2004 | Cheyer et al. |
| 6,721,783 B1 | 4/2004 | Blossman et al. |
| 6,738,964 B1 | 5/2004 | Zink et al. |
| 6,747,679 B1 | 6/2004 | Finch et al. |
| 6,750,885 B1 | 6/2004 | Finch et al. |
| 6,757,837 B1 | 6/2004 | Platt et al. |
| 6,764,009 B2 | 7/2004 | Melick et al. |
| 6,772,216 B1 * | 8/2004 | Ankireddipally et al. .... 709/230 |
| 6,782,536 B2 | 8/2004 | Moore et al. |
| 6,789,252 B1 | 9/2004 | Burke et al. |
| 6,845,499 B2 | 1/2005 | Srivastava et al. |
| 6,847,854 B2 | 1/2005 | Discenzo |
| 6,859,931 B1 | 2/2005 | Cheyer et al. |
| 6,889,197 B2 | 5/2005 | Lidow |
| 6,889,375 B1 | 5/2005 | Chan et al. |
| 6,895,438 B1 | 5/2005 | Ulrich |
| 6,898,783 B1 * | 5/2005 | Gupta et al. ................. 717/105 |
| 6,904,399 B2 | 6/2005 | Cooper et al. |
| 6,907,395 B1 | 6/2005 | Hunt et al. |
| 6,954,736 B2 | 10/2005 | Menninger et al. |
| 6,985,939 B2 | 1/2006 | Fletcher et al. |
| 6,990,466 B1 | 1/2006 | Hu |
| 7,003,474 B2 | 2/2006 | Lidow |
| 7,031,998 B2 | 4/2006 | Archbold |
| 7,043,448 B2 | 5/2006 | Campbell |
| 7,047,518 B2 | 5/2006 | Little et al. |
| 7,050,056 B2 | 5/2006 | Meyringer |
| 7,050,873 B1 | 5/2006 | Discenzo |
| 7,055,136 B2 | 5/2006 | Dzoba et al. |
| 7,058,587 B1 | 6/2006 | Horne |
| 7,069,536 B2 | 6/2006 | Yaung |
| 7,072,855 B1 | 7/2006 | Godlewski et al. |
| 7,076,766 B2 | 7/2006 | Wirts et al. |
| 7,100,195 B1 | 8/2006 | Underwood |
| 7,103,873 B2 | 9/2006 | Tanner et al. |
| 7,117,447 B2 | 10/2006 | Cobb et al. |
| 7,120,597 B1 | 10/2006 | Knudtzon et al. |
| 7,120,896 B2 | 10/2006 | Budhiraja et al. |
| 7,131,069 B1 | 10/2006 | Rush et al. |
| 7,149,887 B2 | 12/2006 | Morrison et al. |
| 7,155,403 B2 | 12/2006 | Cirulli et al. |
| 7,155,409 B1 | 12/2006 | Stroh |
| 7,181,694 B2 | 2/2007 | Reiss et al. |
| 7,184,964 B2 | 2/2007 | Wang |
| 7,194,431 B1 | 3/2007 | Land et al. |
| 7,197,740 B2 | 3/2007 | Beringer et al. |
| 7,200,569 B2 | 4/2007 | Gallagher et al. |
| 7,206,768 B1 | 4/2007 | deGroeve et al. |
| 7,213,232 B1 | 5/2007 | Knowles |
| 7,216,091 B1 | 5/2007 | Blandina et al. |
| 7,219,107 B2 | 5/2007 | Beringer |
| 7,222,786 B2 | 5/2007 | Renz et al. |
| 7,225,240 B1 | 5/2007 | Fox et al. |
| 7,249,044 B2 | 7/2007 | Kumar et al. |
| 7,257,254 B2 | 8/2007 | Tunney |
| 7,283,973 B1 | 10/2007 | Loghmani et al. |
| 7,293,254 B2 | 11/2007 | Bloesch et al. |
| 7,299,970 B1 | 11/2007 | Ching |
| 7,315,830 B1 | 1/2008 | Wirtz et al. |
| 7,322,024 B2 | 1/2008 | Carlson et al. |
| 7,324,966 B2 | 1/2008 | Scheer |
| 7,353,180 B1 | 4/2008 | Silverstone et al. |
| 7,356,492 B2 | 4/2008 | Hazi et al. |
| 7,367,011 B2 | 4/2008 | Ramsey et al. |
| 7,370,315 B1 | 5/2008 | Lovell et al. |
| 7,376,601 B1 | 5/2008 | Aldridge |
| 7,376,604 B1 | 5/2008 | Butcher |
| 7,376,632 B1 | 5/2008 | Sadek et al. |
| 7,383,201 B2 | 6/2008 | Matsuzaki et al. |
| 7,386,833 B2 | 6/2008 | Granny et al. |
| 7,406,716 B2 | 7/2008 | Kanamori et al. |
| 7,415,697 B1 | 8/2008 | Houlding |
| 7,418,409 B1 | 8/2008 | Goel |
| 7,418,424 B2 | 8/2008 | Martin et al. |
| 7,424,701 B2 | 9/2008 | Kendall et al. |
| 7,433,979 B2 | 10/2008 | Need |
| 7,448,022 B1 | 11/2008 | Ram et al. |
| 7,451,432 B2 | 11/2008 | Shukla et al. |
| 7,460,654 B1 | 12/2008 | Jenkins et al. |
| 7,461,030 B2 | 12/2008 | Hibler et al. |
| 7,469,233 B2 | 12/2008 | Shooks et al. |
| 7,516,088 B2 | 4/2009 | Johnson et al. |
| 7,523,054 B2 | 4/2009 | Tyson-Quah |
| 7,529,699 B2 | 5/2009 | Fuse et al. |
| 7,536,325 B2 | 5/2009 | Randell et al. |
| 7,536,354 B1 | 5/2009 | deGroeve et al. |
| 7,546,520 B2 | 6/2009 | Davidson et al. |
| 7,546,575 B1 | 6/2009 | Dillman et al. |
| 7,565,640 B2 | 7/2009 | Shukla et al. |
| 7,574,694 B2 | 8/2009 | Mangan et al. |
| 7,624,371 B2 | 11/2009 | Kulkarni et al. |
| 7,631,291 B2 | 12/2009 | Shukla et al. |
| 7,640,195 B2 | 12/2009 | Von Zimmermann et al. |
| 7,640,291 B2 | 12/2009 | Maturana et al. |
| 7,644,390 B2 | 1/2010 | Khodabandehloo et al. |
| 7,657,406 B2 | 2/2010 | Tolone et al. |
| 7,657,445 B1 | 2/2010 | Goux |
| 7,665,083 B2 | 2/2010 | Demant et al. |
| 7,668,761 B2 | 2/2010 | Jenkins et al. |

| Patent/Pub No. | Date | Name |
|---|---|---|
| 7,672,888 B2 | 3/2010 | Allin et al. |
| 7,681,176 B2 | 3/2010 | Wills et al. |
| 7,693,586 B2 | 4/2010 | Dumas et al. |
| 7,703,073 B2 | 4/2010 | Illowsky et al. |
| 7,739,160 B1 | 6/2010 | Ryan et al. |
| 7,742,985 B1 | 6/2010 | Digrigoli et al. |
| 7,747,980 B2 | 6/2010 | Illowsky et al. |
| 7,765,156 B2 | 7/2010 | Staniar et al. |
| 7,765,521 B2 | 7/2010 | Bryant |
| 7,788,145 B2 | 8/2010 | Wadawadigi et al. |
| 7,788,319 B2 | 8/2010 | Schmidt |
| 7,793,256 B2 | 9/2010 | Charisius et al. |
| 7,793,258 B2 | 9/2010 | Sundararajan et al. |
| 7,797,698 B2 | 9/2010 | Diament et al. |
| 7,814,142 B2 | 10/2010 | Mamou et al. |
| 7,822,682 B2 | 10/2010 | Arnold et al. |
| 7,835,971 B2 | 11/2010 | Stockton et al. |
| 7,886,041 B2 | 2/2011 | Outhred et al. |
| 7,895,568 B1 | 2/2011 | Goodwin et al. |
| 7,904,350 B2 | 3/2011 | Ayala et al. |
| 7,912,755 B2 | 3/2011 | Perry et al. |
| 7,917,889 B2 | 3/2011 | Devarakonda et al. |
| 7,925,985 B2 | 4/2011 | Moore |
| 8,001,519 B2 | 8/2011 | Conallen et al. |
| 8,010,938 B2 | 8/2011 | Elaasar |
| 8,051,332 B2 | 11/2011 | Zakonov et al. |
| 8,091,065 B2 | 1/2012 | Mir et al. |
| 8,112,738 B2 | 2/2012 | Pohl et al. |
| 2001/0052108 A1 | 12/2001 | Bowman-Amuah |
| 2002/0026394 A1 | 2/2002 | Savage et al. |
| 2002/0042756 A1 | 4/2002 | Kumar et al. |
| 2002/0049622 A1 | 4/2002 | Lettich et al. |
| 2002/0073114 A1 | 6/2002 | Nicastro et al. |
| 2002/0078046 A1 | 6/2002 | Uluakar et al. |
| 2002/0082892 A1 | 6/2002 | Raffel et al. |
| 2002/0103660 A1 | 8/2002 | Cramon et al. |
| 2002/0104071 A1 | 8/2002 | Charisius et al. |
| 2002/0107826 A1 | 8/2002 | Ramachandran et al. |
| 2002/0120553 A1 | 8/2002 | Bowman-Amuah |
| 2002/0133368 A1 | 9/2002 | Strutt et al. |
| 2002/0138281 A1 | 9/2002 | Cirulli et al. |
| 2002/0138358 A1 | 9/2002 | Scheer |
| 2002/0143598 A1 | 10/2002 | Scheer |
| 2002/0156695 A1 | 10/2002 | Edwards |
| 2002/0161907 A1 | 10/2002 | Moon |
| 2002/0184111 A1 | 12/2002 | Swanson |
| 2002/0188486 A1 | 12/2002 | Gil et al. |
| 2002/0198798 A1 | 12/2002 | Ludwig et al. |
| 2002/0198828 A1 | 12/2002 | Ludwig et al. |
| 2003/0009754 A1 | 1/2003 | Rowley et al. |
| 2003/0058277 A1 | 3/2003 | Bowman-Amuah |
| 2003/0069774 A1 | 4/2003 | Hoffman et al. |
| 2003/0074271 A1 | 4/2003 | Viswanath et al. |
| 2003/0074360 A1 | 4/2003 | Chen et al. |
| 2003/0083762 A1 | 5/2003 | Farrah et al. |
| 2003/0084127 A1 | 5/2003 | Budhiraja et al. |
| 2003/0130860 A1 | 7/2003 | Datta et al. |
| 2003/0182206 A1 | 9/2003 | Hendrix et al. |
| 2003/0212602 A1 | 11/2003 | Schaller |
| 2003/0233290 A1 | 12/2003 | Yang et al. |
| 2004/0015367 A1 | 1/2004 | Nicastro et al. |
| 2004/0034578 A1 | 2/2004 | Oney et al. |
| 2004/0054564 A1 | 3/2004 | Fonseca et al. |
| 2004/0093268 A1 | 5/2004 | Ramchandani et al. |
| 2004/0093381 A1 | 5/2004 | Hodges et al. |
| 2004/0111304 A1 | 6/2004 | Meka et al. |
| 2004/0111639 A1* | 6/2004 | Schwartz et al. ............. 713/201 |
| 2004/0128180 A1 | 7/2004 | Abel et al. |
| 2004/0133481 A1* | 7/2004 | Schwarze et al. .............. 705/26 |
| 2004/0153359 A1 | 8/2004 | Ho et al. |
| 2004/0158506 A1 | 8/2004 | Wille |
| 2004/0172510 A1 | 9/2004 | Nagashima et al. |
| 2004/0181470 A1 | 9/2004 | Grounds |
| 2004/0181538 A1* | 9/2004 | Lo et al. ...................... 707/100 |
| 2004/0205011 A1 | 10/2004 | Northington et al. |
| 2004/0236639 A1 | 11/2004 | Candadai et al. |
| 2004/0236687 A1 | 11/2004 | Tyson-Quah |
| 2004/0243489 A1 | 12/2004 | Mitchell et al. |
| 2004/0254866 A1 | 12/2004 | Crumbach et al. |
| 2004/0255152 A1 | 12/2004 | Kanamori et al. |
| 2005/0010501 A1 | 1/2005 | Ward, Jr. |
| 2005/0033588 A1 | 2/2005 | Ruiz et al. |
| 2005/0044015 A1 | 2/2005 | Bracken et al. |
| 2005/0060235 A2 | 3/2005 | Byrne |
| 2005/0060408 A1 | 3/2005 | McIntyre et al. |
| 2005/0065828 A1 | 3/2005 | Kroswek et al. |
| 2005/0108680 A1 | 5/2005 | Cheng et al. |
| 2005/0113092 A1 | 5/2005 | Coppinger et al. |
| 2005/0114829 A1 | 5/2005 | Robin et al. |
| 2005/0125310 A1 | 6/2005 | Hazi et al. |
| 2005/0144125 A1 | 6/2005 | Erbey et al. |
| 2005/0144226 A1 | 6/2005 | Purewal |
| 2005/0156500 A1 | 7/2005 | Birecki et al. |
| 2005/0160104 A1 | 7/2005 | Meera et al. |
| 2005/0165784 A1 | 7/2005 | Gomez et al. |
| 2005/0177435 A1 | 8/2005 | Lidow |
| 2005/0203760 A1 | 9/2005 | Gottumukkala et al. |
| 2005/0203813 A1 | 9/2005 | Welter et al. |
| 2005/0209732 A1 | 9/2005 | Audimoolam et al. |
| 2005/0209943 A1 | 9/2005 | Ballow et al. |
| 2005/0216325 A1 | 9/2005 | Ziad et al. |
| 2005/0216507 A1 | 9/2005 | Wright |
| 2005/0222896 A1 | 10/2005 | Rhyne et al. |
| 2005/0234787 A1 | 10/2005 | Wallmeier et al. |
| 2005/0235020 A1 | 10/2005 | Gabelmann et al. |
| 2005/0240592 A1 | 10/2005 | Mamou et al. |
| 2005/0246250 A1 | 11/2005 | Murray |
| 2005/0246482 A1 | 11/2005 | Gabelmann et al. |
| 2005/0256775 A1 | 11/2005 | Schapler et al. |
| 2005/0256882 A1 | 11/2005 | Able et al. |
| 2005/0257125 A1 | 11/2005 | Roesner et al. |
| 2005/0257197 A1* | 11/2005 | Herter et al. .................. 717/116 |
| 2005/0262192 A1 | 11/2005 | Mamou et al. |
| 2005/0262453 A1 | 11/2005 | Massasso |
| 2005/0284934 A1 | 12/2005 | Ernesti et al. |
| 2005/0288987 A1 | 12/2005 | Sattler et al. |
| 2005/0289020 A1 | 12/2005 | Bruns et al. |
| 2005/0289079 A1 | 12/2005 | Krishan et al. |
| 2006/0004802 A1 | 1/2006 | Phillips et al. |
| 2006/0053063 A1 | 3/2006 | Nagar |
| 2006/0064344 A1 | 3/2006 | Lidow |
| 2006/0074704 A1 | 4/2006 | Shukla et al. |
| 2006/0074731 A1 | 4/2006 | Green et al. |
| 2006/0080338 A1 | 4/2006 | Seubert et al. |
| 2006/0085243 A1 | 4/2006 | Cooper et al. |
| 2006/0085294 A1 | 4/2006 | Boerner et al. |
| 2006/0085336 A1 | 4/2006 | Seubert et al. |
| 2006/0089886 A1 | 4/2006 | Wong |
| 2006/0095439 A1 | 5/2006 | Buchamann et al. |
| 2006/0129978 A1 | 6/2006 | Abrari et al. |
| 2006/0143029 A1 | 6/2006 | Akbay et al. |
| 2006/0149574 A1 | 7/2006 | Bradley et al. |
| 2006/0206352 A1 | 9/2006 | Pulianda |
| 2006/0248504 A1 | 11/2006 | Hughes |
| 2006/0274720 A1 | 12/2006 | Adams et al. |
| 2006/0287939 A1 | 12/2006 | Harel et al. |
| 2006/0288350 A1 | 12/2006 | Grigorovitch et al. |
| 2007/0011650 A1 | 1/2007 | Hage et al. |
| 2007/0022410 A1 | 1/2007 | Ban et al. |
| 2007/0050308 A1 | 3/2007 | Latvala et al. |
| 2007/0075916 A1 | 4/2007 | Bump et al. |
| 2007/0094098 A1 | 4/2007 | Mayer et al. |
| 2007/0094261 A1 | 4/2007 | Phelan et al. |
| 2007/0129964 A1 | 6/2007 | Helmolt et al. |
| 2007/0129984 A1 | 6/2007 | Von Helmolt et al. |
| 2007/0129985 A1 | 6/2007 | Helmolt et al. |
| 2007/0143164 A1 | 6/2007 | Kaila et al. |
| 2007/0150332 A1 | 6/2007 | Grichnik et al. |
| 2007/0150387 A1 | 6/2007 | Seubert et al. |
| 2007/0150855 A1 | 6/2007 | Jeong |
| 2007/0156428 A1 | 7/2007 | Brecht-Tillinger et al. |
| 2007/0156430 A1 | 7/2007 | Kaetker et al. |
| 2007/0156474 A1 | 7/2007 | Scherberger et al. |
| 2007/0156475 A1 | 7/2007 | Berger et al. |
| 2007/0156476 A1 | 7/2007 | Koegler et al. |
| 2007/0156482 A1 | 7/2007 | Bagheri |
| 2007/0156489 A1 | 7/2007 | Berger et al. |
| 2007/0156493 A1 | 7/2007 | Tebbe et al. |

| | | | |
|---|---|---|---|
| 2007/0156499 A1 | 7/2007 | Berger et al. | |
| 2007/0156500 A1 | 7/2007 | Merkel et al. | |
| 2007/0156538 A1 | 7/2007 | Peter et al. | |
| 2007/0156550 A1 | 7/2007 | Der Emde et al. | |
| 2007/0156731 A1 | 7/2007 | Ben-Zeev | |
| 2007/0162893 A1 | 7/2007 | Moosmann et al. | |
| 2007/0164849 A1 | 7/2007 | Haeberle et al. | |
| 2007/0168303 A1 | 7/2007 | Moosmann et al. | |
| 2007/0174068 A1 | 7/2007 | Alfandary et al. | |
| 2007/0174145 A1 | 7/2007 | Hetzer et al. | |
| 2007/0174811 A1 | 7/2007 | Kaetker et al. | |
| 2007/0186209 A1 | 8/2007 | Kaetker et al. | |
| 2007/0197877 A1 | 8/2007 | Decorte et al. | |
| 2007/0198391 A1 | 8/2007 | Dreyer et al. | |
| 2007/0214065 A1 | 9/2007 | Kahlon et al. | |
| 2007/0220046 A1 | 9/2007 | Moosmann et al. | |
| 2007/0220143 A1 | 9/2007 | Lund et al. | |
| 2007/0233539 A1 | 10/2007 | Suenderhauf et al. | |
| 2007/0233541 A1 | 10/2007 | Schorr et al. | |
| 2007/0233545 A1 | 10/2007 | Cala et al. | |
| 2007/0233574 A1 | 10/2007 | Koegler et al. | |
| 2007/0233575 A1 | 10/2007 | Berger et al. | |
| 2007/0233581 A1 | 10/2007 | Peter | |
| 2007/0233598 A1 | 10/2007 | Der Emde et al. | |
| 2007/0234282 A1 | 10/2007 | Prigge et al. | |
| 2007/0239508 A1 | 10/2007 | Fazal et al. | |
| 2007/0239569 A1 | 10/2007 | Lucas et al. | |
| 2007/0265860 A1 | 11/2007 | Herrmann et al. | |
| 2007/0265862 A1 | 11/2007 | Freund et al. | |
| 2008/0004929 A9 | 1/2008 | Raffel et al. | |
| 2008/0017722 A1 | 1/2008 | Snyder et al. | |
| 2008/0027831 A1 | 1/2008 | Gerhardt | |
| 2008/0065437 A1 | 3/2008 | Dybvig | |
| 2008/0120129 A1 | 5/2008 | Seubert et al. | |
| 2008/0147507 A1 | 6/2008 | Langhammer | |
| 2008/0162382 A1 | 7/2008 | Clayton et al. | |
| 2008/0208707 A1 | 8/2008 | Erbey et al. | |
| 2008/0215354 A1 | 9/2008 | Halverson et al. | |
| 2008/0263152 A1 | 10/2008 | Daniels et al. | |
| 2008/0300959 A1 | 12/2008 | Sinha et al. | |
| 2009/0037287 A1 | 2/2009 | Baitalmal et al. | |
| 2009/0037492 A1 | 2/2009 | Baitalmal et al. | |
| 2009/0063112 A1 | 3/2009 | Hader et al. | |
| 2009/0171716 A1 | 7/2009 | Suenderhauf et al. | |
| 2009/0171818 A1 | 7/2009 | Penning et al. | |
| 2009/0172699 A1 | 7/2009 | Jungkind et al. | |
| 2009/0189743 A1 | 7/2009 | Abraham et al. | |
| 2009/0192858 A1 | 7/2009 | Johnson | |
| 2010/0070324 A1 | 3/2010 | Bock et al. | |
| 2010/0070331 A1 | 3/2010 | Koegler et al. | |
| 2010/0070336 A1 | 3/2010 | Koegler et al. | |
| 2010/0070395 A1 | 3/2010 | Elkeles et al. | |
| 2010/0070555 A1 | 3/2010 | Duparc et al. | |
| 2010/0100464 A1 | 4/2010 | Ellis et al. | |
| 2010/0138269 A1 | 6/2010 | Cirpus et al. | |
| 2011/0252395 A1 | 10/2011 | Charisius et al. | |

OTHER PUBLICATIONS

"American Software Announces ASP Pricing Model for It's a-Applications Expense Business Solution"; PR Newswire; Mar. 6, 2000; 2 pages.

Anon.; "Sequent Corp Bell Atlantic: Bell Atlantic Selects Sequent for Video-on-Demand Program; Sequent Moves to Sieze Opportunity in New Market"; Business Wire; Dec. 6, 1994.

Anon.; "State of the Art Reports 13,000 MAS 90 for WINDOWS Shipments in First Nine Months of Availability"; PR Newswire; Apr. 28, 1997.

Anonymous; "Mastering Management"; Motor Age, vol. 25, No. 10; Oct. 2006; pp. 1-3.

Arch-int, S. et al.; "Development of Industrial Information Systems on the Web Using Busienss Components"; Computers in Industry; vol. 60; 2003; pp. 231-250.

Astudillo, H.; "How Conceptual System Architecture Leads to Business Process"; ACM; 2000; pp. 35-36.

Avanquest's Bookkeeper 2007 Provides All-in-One Solution for Small Business Accounting and Financial Management; New Version of Popular Software Enables Detailed Report Creation and In-House Payroll Processing; PR Newswire; New York; Oct. 3, 2006.

Avery, S.; "Buyers' Guide to Software for Purchasing 2000.(Directory)"; Purchasing, vol. 129, No. 1; p. 179; Jul. 13, 2000.

Bastani et al.; "Complex Open System Design by Quasi Agents: Process Oriented Modeling in Agent Based Systems"; ACM SIGSOFT; vol. 34, No. 4; 2009; pp. 1-14.

Bastani et al.; "Process Oriented Abstraction of the Complex Evolvable Systems: Problem Model Construction"; ACM SIGSOFT; vol. 33, No. 3; 2008; pp. 1-13.

Beisiegel, M. et al.; "Service Component Architecture: Building Systems Using a Service Oriented Architecture"; Whitepaper [online]; Nov. 2005; pp. 1-31; http://download.boulder.ibm.com/ibmdl/pub/software/dw/specs/ws-sca/SCA_White_Paper1_09.pdf.

Bin et al.; "Component Model Optimization for Distributed Real-Time Embedded Software"; IEEE International Conference on Systems, Man and Cybernetics; Oct. 13, 2004; 6 pages.

Cascallar, Eduardo et al.; "Assessment in the Evaluation of Self-Regulation as a Process"; Educational Psychology Review; vol. 18, No. 3; Sep. 2006; pp. 297-306.

"Cendant Announces Comprehensive Online Travel Booking to Meet President Bush's eTravel Initiative"; PR Newswire; Jul. 9, 2002; 3 pages.

Chen, M. and Meixell, M.; "Web Services Enabled Procurement in the Extended Enterprise: An Architectural Design and Implementation"; Journal of Electronic Commerce Research, vol. 4, No. 4; 2003; pp. 140-155.

Cohen; "Optimizer: IBM's Multi-Echelon Inventory System for Managing Service Logistics Interfaces"; vol. 20, No. 1; 1990; pp. 65-82.

Cohen et al.; "Saturn's Supply-Chain Innovation: High Value in After Sales Service"; Sloan Management Review; vol. 41, No. 4; 2000; pp. 93-101.

Cool, David W.; "Activity Fund Accounting"; School Business Affairs; vol. 49, No. 6; Jun. 1983; pp. 50-52.

Cowan, D.D. et al.; "Application Integration: Constructing Composite Applications from Interactive Components"; Software Practice and Experience; vol. 23, No. 3; Mar. 1993; pp. 255-275.

Cox et al.; "A Formal Model for Component Based Software"; IEEE; Aug. 7, 2002; 8 pages.

Deimel, A.; "The SAP R/3 Business Framework"; Software—Concepts & Tools; vol. 19, No. 1; 1998; pp. 29-36.

Duc et al.; "Uniform Object Modeling Methodology and Reuse of Real Time System Using UML"; EMSOFT '05; Sep. 19-22, 2005; pp. 44-47.

Fellner, K.J., et al.; "Classification Framework for Business Components"; System Sciences; Proceedings of the 33rd Annual Hawaii International Conference; Jan. 2000; pp. 3239-3248.

Ferguson D.F. et al.; "Service-Oriented Architecture: Programming Model and Product Architecture"; IBM Systems Journal [online]; vol. 44, No. 4; Dec. 1, 2005; pp. 753-780; http://researchweb.watson.ibm.com/journal/sj/444/ferguson.pdf.

Ferscha et al.; "A Light-Weight Component Model for Peer-to-Peer Applications"; IEEE; Mar. 23, 2004.

Finin et al.; "KQML as an Agent Communication Language"; retrieved on Jul. 26, 2011; pp. 456-463. <http://portal.acm.org/citation.cfm?id=191322>.

Flissi et al.; "A Component-based Software Infrastructure for Ubiquitous Computing"; IEEE; Jul. 4, 2005.

Gauthier, P. and OSS-J Architecture Board; "OSS through Java (TM) J2EE Design Guidelines"; [online]; Oct. 31, 2001; http://www.ossj.org/downloads/design_guidelines.shtml.

Gerin et al.; "Flexible and Executable Hardware/Software Interface Modeling for Multiprocessor SOC Design Using SystemC"; IEEE; 2007; pp. 390-395.

Gessford, J.E.; "Object-Oriented System Design"; Emerging Information Technologies for Competitive Advantage and Economic Development; Proceedings of the 1992 Information Resources Management Association International Conference; 1992; pp. 110-118.

Gomaa et al.; "Model Based Software Design and Adaption"; International Workshop on Software Engineering for Adaptive and Self-Managing Systems (SEAMS '07); IEEE; 2007; 10 pages.

Gould; "Integrating the Manufacturing Enterprise"; Automative Design & Production; 119, 1; ABI/INFORM Global; Jan. 2007; 3 pages.

Hahn; "A Domain Specific Modeling Language for Multi-Agent Systems"; ACM AAMAS; 2008; pp. 233-240.

He, J. et al.; "Component-Based Software Engineering: The Need to Link Methods and Their Theories"; Theoretical Aspects of Computer ICTAC 2005; Second International Colloquium Proceedings (Lecture notes in Computer Science vol. 3722); Oct. 2005; pp. 70-95.

Hu; "A Co-Design Modeling Approach for Computer Network Systems"; IEEE; 2007; pp. 685-693.

Huang, S. et al.; "Computer-Assisted Supply Chain Configuration Based on Supply Chain Operations Reference (SCOR) Model"; Computers & Industrial Engineering 48; 2005; pp. 377-394.

"Hudson's Bay Company Realizes Fast ROI with the Oracle E-Business Suite"; PR Newswire; New York; Jan. 15, 2002; p. 1.

Intuit Canada Ltd.; "Startup Guide—QuickBooks Basic for Windows, QuickBooks Pro for Windows, QuickBooks Premier for Windows"; 2002; 230 pages.

Jennings et al.; "Autonomous Agents for Business Process Management"; 2000 Applied Artificial Intelligence; retrieved on Jul. 25, 2011; pp. 145-189. <http://citeseerx.ist.psu.edu/viewdoc/download?doi=10.1.1.58.624&rep=rep1&1type=pdf>.

Kalakota et al.; "Readings in Electronic Commerce"; Addison-Wesley Longman, Inc.; 1995; ISBN: 0-201-88060-1.

Kozacynski, W.; "Architecture Framework for Business Components"; Software Reuse 1998 Proceedings; Fifth International Conferences on Victoria, BC, Canada; Jun. 1998; IEEE Comput. Soc; pp. 300-307.

Kremic, Tibor; "Outsourcing Decision Support: A Survey of Benefits, Risks, and Decision Factor"; Supply Chain Management; V. 11; 2006; pp. 467-482.

Kythe, D.K.; "The Promise of Distributed Business Components"; Bell Labs Technical Journal; vol. 75, No. 2; Mar./Apr. 1999; pp. 20-28.

Lambert et al.; "Supply Chain Metrics"; International Journal of Logistics Management; vol. 12, No. 1; 2001; pp. 1-19.

Linthicum, D.S.; "Chapter 9: RPCs, Messaging, and B2B Application Integration"; B2B Application Integration: E-Business Enable Your Enterprise; 2001; pp. 167-181.

Lockamy III, et al.; "Linking SCOR Planning Practices to Supply Chain Performance"; International Journal of Operations & Production Management; vol. 24, No. 12; 2004; pp. 1192-1218.

mySAP™ ERP 2005; Downloaded Mar. 24, 2010 from <http://web.archive.org/web/20061104021205/www.sap.com/solutions/business-suite/erp/pdf/BWP_mySAP_ERP_2005.pdf>; 60 pages.

Nori A.K. et al.; "Composite Applications: Process Based Application Development"; Lecture Notes in Computer Science; vol. 2444; Aug. 2003; pp. 48-53.

"Oracle Expands E-Commerce Offerings with the Acquisition of E-Travel, Inc."; PR Newswire; Mar. 9, 1999; 3 pages.

Ouyang et al.; "From Business Process Models to Process Oriented Software Systems"; ACM Transactions on Software Engineering and Methodology; vol. 19, No. 1, Article 2; Aug. 2009; pp. 1-37.

Orsburn; "Spares Management Handbook"; McGrawHill; 1991; ISBN: 0-8306-7626-0.

Papazoglou et al; "Service-Oriented Computing Research Road Map"; http://infolab.uvt.nl/pub/papazogloump-2006-96.pdf; Mar. 1, 2006; 29 pages.

Pilhofer, F.; "Writing and Using CORBA Components"; Apr. 2002; http://www.fpx.de/MicoCCM/download/mico-ccm.pdf; 17 pages.

Ravichandran, T.; "Special Issue on Component-Based Software Development"; The Data Base for Advances in Information Systems; 2003; pp. 45-46.

Rossi et al.; "Designing and Architecturing Process-aware Web Applications with EPML"; SAC '08; Mar. 16-20, 2008; pp. 2409-2414.

Sarjoughian et al.; "CoSMOs: A Visual Environment for Component Based Modeling, Experimental Design and Simulation"; ACM; 2009; pp. 1-9.

"SAP Delivers Next-generation ERP to Customers"; PR Newswire; New York; Mar. 10, 2005; 7 pages.

SAP AG; "Designing Cross Solutions"; SAP XAPPS, [online]; Sep. 2003; pp. 1-2; http://www.sap.com/belux/platform/netweaver/pdf/BWP_CAF.pdf.

SAP AG; "SAP NetWeaver Visual Composer: User Guide (SAP NetWeaver Visual Composer release 6.0)"; Document version 1.1; 2004; pp. 1-208.

SAP AG; "Powered by SAP NetWeaver Partner Program—Frequently Asked Questions"; May 2005; 10 pages [online] http://www.lionbridge.com/NR/rdonlyres/4940BE1F/DA46/412E/AB16/F049BD865CA1/0/PBMWFAQ_50070686_en.pdf.

Schaub, Thomas et al.; "Enterprise Management Application Providing Availability Control Checks on Revenue Budgets"; Aerospace & High Technology, ANTE: Abstracts in New Technologies and Engineering; Metdex, Mechanical & Transportation Engineering Abstracts; Date Unknown. p. 1.

Schmid, H.A.; "Business Entity Components and Buisness Process Components"; Joop; vol. 12, No. 6; Oct. 1999; pp. 6-10, 12-15.

Schultz, G.J.; "Keeping SCOR on Your Supply Chain: Basic Operations Reference Model Updates with the Times"; Information Strategy: The Executive's Journal; Summer 2003; pp. 12-20.

Sharifi, M. et al.; "CORBA Components Collocation Optimization Enhanced with Local ORB-Like Services Support"; On the Move to Meaningful Internet Systems (2004): COOPIS, ODA and ODBASE. OTM Confederated Conferences COOPIS, DOA and ODBASE 2004; Proceedings Part II (Lecture Notes in Computer Science vol. 3291); 2004; pp. 1143-1154.

Singh, I. et al.; "Designing Enterprise Applications with the J2EE Platform, Second Edition"; Jun. 15, 2002.

Stephens, S.; "Supply Chain Council & Supply Chain Operations Reference (SCOR) Model Overview"; <http://www.supply-chain.org>; Version 5.0a; Aug. 2001; 29 pages.

Stephens, S.; "Supply Chain Operatives Reference Model Version 5.0: A New Tool to Improve Supply Chain Efficiency and Achieve Best Practice"; Information Systems Frontiers 3:4, 2001; pp. 471-476.

Stojanovic, Z. et al.; "Modeling and Design of Service-Oriented Architecture"; Systems, Man and Cybernetics; 2004 IEEE International Conference on The Hague, The Netherlands; Oct. 2004; IEEE, vol. 5; pp. 4147-4152.

Strelich, Thomas P. et al.; "Simulation-Based Transformation with the Service Integration/Interoperation Infrastructure"; Technology Review Journal; Fall/Winter 2005; pp. 99-115.

Thomas, A.; "Enterprise JavaBeans Server Component Model for Java"; [online]; Dec. 1997; http://www.cs.indiana.edu/classes/b649-gann/ejb-white-paper.pdf.

"Time Management with mySAP™ ERP Human Capital Management"; Downloaded Mar. 24, 2010 from <http://web.archive.org/web/20060105084834/www.sap.com/solutions/business-suite/erp/hcm/pdf/HCM_Time_Management.pdf>; 4 pages.

Vescovi, Marcos and Hagmann, Christian; "Rules Engine for Enterprise System"; Areospace & High Technology, ANTE: Abstracts in New Technologies and Engineering; Metadex, Mechanical & Transportation Engineering Abstracts; Date Unknown; p. 1.

Vergil Technology Ltd.; "Vergil Composite Application Builder Suite"; Product Datasheet [online]; 2003; pp. 1-5; http://www.webservicesmall.com.docs/VCAB_datasheet.pdf.

Vogel et al.; "mySAP ERP for Dummies"; Published on Sep. 30, 2005; Downloaded on Mar. 23, 2001 from <http://proquest.safaribooksonline.com/9780764599958> 41 pages.

Woods, D.; "Packaged Composite Applications: A Liberating Force for the User Interface"; Internet Citation [online]; Oct. 2004; 4 pages; http://www.sapdesignguild.org/editions/edition7/print_composite_applications.asp.

International Search Report and Written Opinion of the International Searching Authority issued in International Application No. PCT/EP2006/012625; Apr. 3, 2007; 8 pages.

International Preliminary Report on Patentability issued in International Application No. PCT/EP2006/012625; Jul. 1, 2008; 7 pages.

International Search Report and Written Opinion of the International Searching Authority issued in International Application No. PCT/EP2006/012614; Mar. 16, 2007; 7 pages.

International Preliminary Report on Patentability issued in International Application No. PCT/US2006/012614; Jul. 1, 2008; 6 pages.

International Search Report and Written Opinion of the International Searching Authority issued in International Application No. PCT/EP2006/012618; Apr. 3, 2007; 8 pages.
International Preliminary Report on Patentability issued in International Application No. PCT/EP2006/012618; Jul. 1, 2008; 7 pages.
International Search Report and Written Opinion of the International Searching Authority issued in International Application No. PCT/EP2006/012613; May 3, 2007; 6 pages.
International Preliminary Report on Patentability issued in International Application No. PCT/EP2006/012613; Jul. 1, 2008; 6 pages.
International Search Report and Written Opinion of the International Searching Authority issued in International Application No. PCT/EP2006/012624; Mar. 30, 2007; 9 pages.
International Preliminary Report on Patentability issued in International Application No. PCT/EP2006/012624; Jul. 1, 2008; 8 pages.
International Search Report and Written Opinion of the International Searching Authority issued in International Application No. PCT/EP2006/012623; May 7, 2007; 8 pages.
International Preliminary Report on Patentability issued in International Application No. PCT/EP2006/012623; Jul. 1, 2008; 7 pages.
International Search Report and Written Opinion of the International Searching Authority issued in International Application No. PCT/EP2006/012620; Mar. 21, 2007; 7 pages.
International Preliminary Report on Patentability issued in International Application No. PCT/EP2006/012620; Jul. 1, 2008; 6 pages.
International Search Report and Written Opinion of the International Searching Authority issued in International Application No. PCT/EP2006/012619; Apr. 19, 2007; 8 pages.
International Preliminary Report on Patentability issued in International Application No. PCT/EP2006/012619; Jul. 1, 2008; 7 pages.
International Search Report and Written Opinion of the International Searching Authority issued in International Application No. PCT/EP2006/012621; Apr. 19, 2007; 8 pages.
International Preliminary Report on Patentability issued in International Application No. PCT/EP2006/012621; Jul. 1, 2008; 7 pages.
International Search Report and Written Opinion of the International Searching Authority issued in International Application No. PCT/EP2007/002835; Aug. 9, 2007; 12 pages.
International Preliminary Report on Patentability issued in International Application No. PCT/EP2007/002835; Sep. 30, 2008; 8 pages.
International Search Report and Written Opinion of the International Searching Authority issued in International Application No. PCT/EP2007/002841; Aug. 16, 2007; 12 pages.
International Preliminary Report on Patentability under Chapter I issued in International Application No. PCT/EP2007/002841; Sep. 30, 2008; 8 pages.
Communication Pursuant to Article 94(3) EPC issued in European Application No. 06841224.6; May 15, 2009; 8 pages.
Communication Pursuant to Article 94(3) EPC issued in European Application No. 06847009.5; May 15, 2009; 10 pages.
Communication Pursuant to Article 94(3) EPC issued in European Application No. 07007130.3; Dec. 5, 2008; 6 pages.
Extended European Search Report issued in European Application No. 07007130.3; Oct. 5, 2007; 6 pages.
Notice of Allowance issued in U.S. Appl. No. 12/233,554 on May 14, 2010; 11 pages.
Notice of Allowance issued in U.S. Appl. No. 12/233,554 on Sep. 17, 2010; 10 pages.
Notice of Allowance issued in U.S. Appl. No. 12/233,554 on Feb. 22, 2011; 7 pages.
Notice of Allowance issued in U.S. Appl. No. 12/233,554 on Jun. 27, 2011; 7 pages.
Office Action issued in U.S. Appl. No. 12/233,550 on Jan. 12, 2011; 29 pages.
Notice of Allowance issued in U.S. Appl. No. 12/233,550 on May 11, 2011; 20 pages.
Notice of Allowance issued in U.S. Appl. No. 12/233,550 on Jan. 9, 2012; 11 pages.
Office Action issued in U.S. Appl. No. 12/333,146 on Sep. 6, 2011; 21 pages.
Office Action issued in U.S. Appl. No. 11/322,482; Jan. 7, 2010; 19 pages.
Notice of Allowance issued in U.S. Appl. No. 11/322,482; Jul. 13, 2010; 5 pages.
Office Action issued in U.S. Appl. No. 11/323,590; Jan. 9, 2009; 23 pages.
Office Action issued in U.S. Appl. No. 11/323,590; Jul. 10, 2009; 32 pages.
Office Action issued in U.S. Appl. No. 11/323,590; Dec. 30, 2009; 31 pages.
Office Action issued in U.S. Appl. No. 11/323,590; Jun. 21, 2010; 25 pages.
Office Action issued in U.S. Appl. No. 11/323,634; Sep. 10, 2009; 15 pages.
Office Action issued in U.S. Appl. No. 11/323,634; Apr. 2, 2010; 9 pages.
Office Action issued in U.S. Appl. No. 11/323,634 on Apr. 29, 2011; 8 pages.
Office Action issued in U.S. Appl. No. 11/322,816; Jul. 23, 2009; 41 pages.
Office Action issued in U.S. Appl. No. 11/322,816; Apr. 15, 2010; 27 pages.
Office Action issued in U.S. Appl. No. 11/322,973 on Dec. 7, 2010; 13 pages.
Office Action issued in U.S. Appl. No. 11/322,973 on May 27, 2011; 15 pages.
Office Action issued in U.S. Appl. No. 11/322,383; Nov. 12, 2009; 29 pages.
Office Action issued in U.S. Appl. No. 11/322,383; May 12, 2010; 23 pages.
Office Action issued in U.S. Appl. No. 11/396,327 on Apr. 1, 2010; 26 pages.
Notice of Allowance issued in U.S. Appl. No. 11/396,327 on Nov. 30, 2010; 28 pages.
Notice of Allowance issued in U.S. Appl. No. 11/396,327 on Sep. 28, 2011; 31 pages.
Office Action issued in U.S. Appl. No. 11/404,147 on Nov. 24, 2010; 27 pages.
Office Action issued in U.S. Appl. No. 11/404,147 on Aug. 4, 2011; 26 pages.
Office Action issued in U.S. Appl. No. 12/233,479 on Oct. 27, 2011; 24 pages.
Office Action issued in U.S. Appl. No. 12/332,965 on Oct. 11, 2011; 6 pages.
Notice of Allowance issued in U.S. Appl. No. 12/233,462 on Feb. 2, 2011; 11 pages.
Notice of Allowance issued in U.S. Appl. No. 12/233,462 on May 18, 2011; 6 pages.
Notice of Allowance issued in U.S. Appl. No. 12/233,462 on Sep. 2, 2011; 7 pages.
Notice of Allowance in U.S. Appl. No. 12/233,462 on Dec. 12, 2011; 6 pages.
Office Action issued in U.S. Appl. No. 12/233,289 on Oct. 27, 2011; 15 pages.
Office Action issued in U.S. Appl. No. 12/233,457 on May 26, 2011; 19 pages.
Notice of Allowance issued in U.S. Appl. No. 12/233,457 on Nov. 3, 2011; 12 pages.
Office Action issued in U.S. Appl. No. 11/967,483 on Aug. 20, 2010; 10 pages.
Office Action issued in U.S. Appl. No. 11/967, 483 on Mar. 4, 2011; 6 pages.
Office Action issued in U.S. Appl. No. 12/327,232 on May 26, 2011; 20 pages.
Notice of Allowance issued in U.S. Appl. No. 12/327,232 on Nov. 2, 2011; 16 pages.
Office Action issued in U.S. Appl. No. 12/327,590 on Jun. 23, 2011; 16 pages.
Notice of Allowance issued in U.S. Appl. No. 12/327,590 on Dec. 28, 2011; 10 pages.
Office Action issued in U.S. Appl. No. 12/327,701 on Nov. 8, 2011; 20 pages.
Office Action issued in U.S. Appl. No. 12/333,085; Jun. 25, 2009; 9 pages.

Office Action issued in U.S. Appl. No. 12/333,085; Mar. 23, 2010; 5 pages.
Notice of Allowance issued in U.S. Appl. No. 12/333,085; Sep. 13, 2010; 8 pages.
Office Action issued in U.S. Appl. No. 12/233,087 on Aug. 18, 2011; 42 pages.
Notice of Allowance issued in U.S. Appl. No. 12/233,534 on Jun. 24, 2010; 15 pages.
Notice of Allowance issued in U.S. Appl. No. 12/233,534 on Oct. 20, 2010; 15 pages.
Notice of Allowance issued in U.S. Appl. No. 12/233,534 on Jan. 31, 2011; 15 pages.
Notice of Allowance issued in U.S. Appl. No. 12/233,534 on May 16, 2011; 12 pages.
Notice of Allowance issued in U.S. Appl. No. 12/233,534 won Dec. 28, 2011; 7 pages.
Office Action issued in U.S. Appl. No. 11/322,382 on Mar. 29, 2010; 28 pages.
Notice of Allowance issued in U.S. Appl. No. 11/322,382 on Sep. 20, 2010; 6 pages.
Notice of Allowance issued in U.S. Appl. No. 11/322,382 on Jan. 6, 2011; 7 pages.
Notice of Allowance issued in U.S. Appl. No. 11/322,382 on Jul. 25, 2011; 5 pages.
Office Action issued in U.S. Appl. No. 11/396,312 on Mar. 30, 2010; 23 pages.
Office Action issued in U.S. Appl. No. 11/396,312 on Sep. 10, 2010; 23 pages.
Office Action issued in U.S. Appl. No. 11/322,611 on Mar. 31, 2010; 17 pages.
Office Action issued in U.S. Appl. No. 11/322,611 on Sep. 16, 2010; 21 pages.
Notice of Allowance issued in U.S. Appl. No. 11/322,610 on Mar. 1, 2010; 12 pages.
Notice of Allowance issued in U.S. Appl. No. 11/322,610 on Jun. 14, 2010; 6 pages.
Notice of Allowance issued in U.S. Appl. No. 11/322,610 on Sep. 23, 2010; 6 pages.
Notice of Allowance issued in U.S. Appl. No. 11/322,610 on Dec. 22, 2010; 6 pages.
Notice of Allowance issued in U.S. Appl. No. 11/322,610 on Mar. 31, 2011; 6 pages.
Office Action issued in U.S. Appl. No. 11/322,772; Mar. 25, 2009; 12 pages.
Office Action issued in U.S. Appl. No. 11/322,772; Dec. 9, 2009; 14 pages.
Office Action issued in U.S. Appl. No. 11/322,772; Jul. 12, 2010; 18 pages.
Office Action issued in U.S. Appl. No. 11/322,398 on Apr. 2, 2010; 39 pages.
Notice of Allowance issued in U.S. Appl. No. 11/322,398 on Jul. 23, 2010; 38 pages.
Notice of Allowance issued in U.S. Appl. No. 11/322,398 on Oct. 29, 2010; 18 pages.
Notice of Allowanced issued in U.S. Appl. No. 11/322,398 on Nov. 15, 2010; 20 pages.
Notice of Allowanced issued in U.S. Appl. No. 11/322,398 on May 27, 2011; 21 pages.
Notice of Allowanced issued in U.S. Appl. No. 11/322,398 on Oct. 18, 2011; 7 pages.
Office Action issued in U.S. Appl. No. 11/322,383 on May 12, 2010; 23 pages.
Office Action issued in U.S. Appl. No. 11/322,383 on Nov. 12, 2009; 23 pages.
Office Action issued in U.S. Appl. No. 11/323,041; Apr. 30, 2009; 25 pages.
Office Action issued in U.S. Appl. No. 11/323,041 on Mar. 19, 2010; 26 pages.
Advisory Action issued in U.S. Appl. No. 11/323,041 on Jun. 7, 2010; 3 pages.
Office Action issued in U.S. Appl. No. 11/396,236 on Mar. 31, 2010; 20 pages.
Office Action issued in U.S. Appl. No. 11/396,236 on Oct. 28, 2010; 19 pages.
Examiner's Answer to Appeal Brief issued in U.S. Appl. No. 11/396,236 on Nov. 10, 2011; 19 pages.
Office Action issued in U.S. Appl. No. 11/323,039; Sep. 4, 2009; 36 pages.
Office Action issued in U.S. Appl. No. 11/323,039; Apr. 14, 2010; 15 pages.
Office Action issued in U.S. Appl. No. 11/322,612; May 11, 2009; 23 pages.
Office Action issued in U.S. Appl. No. 11/322,612; Apr. 1, 2010; 23 pages.
Advisory Action issued in U.S. Appl. No. 11/322,612; Jun. 24, 2010; 3 pages.
Notice of Allowance issued in U.S. Appl. No. 11/396,259 on Mar. 29, 2010; 19 pages.
Notice of Allowance issued in U.S. Appl. No. 11/396,259 on Jul. 6, 2010; 6 pages.
Notice of Allowance issued in U.S. Appl. No. 11/396,259 on Oct. 15, 2010; 6 pages.
Notice of Allowance issued in U.S. Appl. No. 11/396,259 on Jan. 20, 2011; 6 pages.
Notice of Allowance issued in U.S. Appl. No. 11/396,259 on Aug. 5, 2011; 7 pages.
Office Action issued in U.S. Appl. No. 11/396,288 on Oct. 17, 2011; 38 pages.
Notice of Allowance issued in U.S. Appl. No. 11/396,288; Dec. 28, 2010; 4 pages.
Notice of Allowance issued in U.S. Appl. No. 11/396,288; Sep. 24, 2010; 4 pages.
Notice of Allowance issued in U.S. Appl. No. 11/396,288; May 20, 2010; 15 pages.
Office Action issued in U.S. Appl. No. 11/396,288; Jan. 2, 2009; 26 pages.
Office Action issued in U.S. Appl. No. 11/396,288; Apr. 15, 2008; 26 pages.
Office Action issued in U.S. Appl. No. 11/396,288; Aug. 19, 2009; 20 pages.
Office Action issued in U.S. Appl. No. 11/396,250 on Oct. 18, 2010; 15 pages.
Notice of Allowance issued in U.S. Appl. No. 11/396,250 on Mar. 2, 2011; 13 pages.
Notice of Allowance issued in U.S. Appl. No. 11/396,250 on Jun. 24, 2011; 5 pages.
Notice of Allowance issued in U.S. Appl. No. 11/396,250 on Dec. 7, 2011; 6 pages.
Office Action issued in U.S. Appl. No. 11/396,258; Nov. 25, 2009; 9 pages.
Notice of Allowance issued in U.S. Appl. No. 11/396,258 on Mar. 31, 2010; 9 pages.
Supplemental Notice of Allowance issued in U.S. Appl. No. 11/396,258 on May 19, 2010; 8 pages.
Notice of Allowance issued in U.S. Appl. No. 11/396,258 on Jul. 28, 2010; 9 pages.
Notice of Allowance issued in U.S. Appl. No. 11/396,258 on Nov. 16, 2010; 8 pages.
Notice of Allowance issued in U.S. Appl. No. 11/396,258 on Jun. 28, 2011; 9 pages.
Office Action issued in U.S. Appl. No. 11/322,851; Sep. 2, 2009; 32 pages.
Office Action issued in U.S. Appl. No. 11/322,851; May 12, 2010; 15 pages.
Notice of Allowance issued in U.S. Appl. No. 11/322,851 on Sep. 2, 2011; 8 pages.
Office Action issued in U.S. Appl. No. 11/322,845; Jul. 15, 2010; 16 pages.
Notice of Allowance issued in U.S. Appl. No. 11/322,845; Dec. 27, 2010; 16 pages.
Notice of Allowance issued in U.S. Appl. No. 11/322,845; Apr. 8, 2011; 8 pages.
Notice of Allowance issued in U.S. Appl. No. 11/322,845; Nov. 13, 2011; 9 pages.

Office Action issued in U.S. Appl. No. 11/323,040; Jul. 24, 2009; 35 pages.
Office Action issued in U.S. Appl. No. 11/323,040; Apr. 29, 2010; 17 pages.
Office Action issued in U.S. Appl. No. 11/323,040 on Nov. 5, 2010; 33 pages.
Office Action issued in U.S. Appl. No. 11/323,040 on Jul. 26, 2011; 34 pages.
Office Action issued in U.S. Appl. No. 11/397,026; Jul. 21, 2009; 28 pages.
Notice of Allowance issued in U.S. Appl. No. 11/397,026 on Mar. 29, 2010; 17 pages.
Supplemental Notice of Allowance issued in U.S. Appl. No. 11/397,026 on Jul. 9, 2010; 4 pages.
Notice of Allowance issued in U.S. Appl. No. 11/397,026 on Jul. 26, 2010; 6 pages.
Notice of Allowance issued in U.S. Appl. No. 11/397,026 on Nov. 15, 2010; 7 pages.
Notice of Allowance issued in U.S. Appl. No. 11/397,026 on Mar. 3, 2011; 6 pages.
Notice of Allowance issued in U.S. Appl. No. 11/397,026 on Jul. 20, 2011; 8 pages.
Notice of Allowance issued in U.S. Appl. No. 11/397,026 on Nov. 4, 2011; 8 pages.
Notice of Allowance issued in U.S. Appl. No. 12/233,520 on Nov. 10, 2011; 22 pages.
Office Action issued in U.S. Appl. No. 12/233,417 on Apr. 7, 2011; 32 pages.
Notice of Allowance issued in U.S. Appl. No. 12/233,417 on Sep. 14, 2011; 11 pages.
Notice of Allowance issued in U.S. Appl. No. 11/968,054 on Sep. 7, 2010; 11 pages.
Notice of Allowance issued in U.S. Appl. No. 11/968,054 on Aug. 2, 2011; 5 pages.
Office Action issued in U.S. Appl. No. 12/233,530 on Apr. 29, 2011; 11 pages.
Office Action issued in U.S. Appl. No. 11/967,405 on Apr. 27, 2011; 15 pages.
Office Action issued in U.S. Appl. No. 12/233,458 on Oct. 12, 2011; 19 pages.
Office Action issued in U.S. Appl. No. 12/233,557 on Sep. 16, 2010; 16 pages.
Office Action issued in U.S. Appl. No. 11/967,489 on Sep. 28, 2011; 7 pages.
Office Action issued in U.S. Appl. No. 12/233,557 on Mar. 4, 2011; 19 pages.
Office Action issued in U.S. Appl. No. 12/233,489 on May 13, 2011; 15 pages.
Office Action issued in U.S. Appl. No. 11/967,393 on Apr. 15, 2011; 12 pages.
Notice of Allowance issued in U.S. Appl. No. 11/967,393 on Nov. 9, 2011; 9 pages.
Notice of Allowance issued in U.S. Appl. No. 12/327,354 on Jun. 25, 2010; 16 pages.
Notice of Allowance issued in U.S. Appl. No. 12/327,354 on Oct. 18, 2010; 16 pages.
Notice of Allowance issued in U.S. Appl. No. 12/327,354 on Feb. 1, 2011; 16 pages.
Notice of Allowance issued in U.S. Appl. No. 12/327,354 on Aug. 9, 2011; 13 pages.
Office Action issued in U.S. Appl. No. 11/967,387 on Sep. 8, 2011; 14 pages.
Office Action issued in U.S. Appl. No. 12/233,075 on Aug. 4, 2011; 45 pages.
Notice of Allowance issued in U.S. Appl. No. 11/967,865 on Mar. 31, 2010; 16 pages.
Notice of Allowance issued in U.S. Appl. No. 11/967,865 on Oct. 6, 2010; 6 pages.
Notice of Allowance issued in U.S. Appl. No. 11/967,865 on Jun. 24, 2011; 8 pages.
Notice of Allowance issued in U.S. Appl. No. 11/967,890 on Jul. 15, 2011; 7 pages.
"IDe Partners with Journyx to Offer Customers Best-in-Class Time Management Solution"; PR Newswire; Mar. 8, 2005; Business Dateline.
Meseroll, Robert; "Data Mining Navy Flight"; IEEE Autotestcom 2007; Sep. 2007; pp. 476-481.
"Trakware Systems Inc. Expands Management Team: Leading To-Order Software Provider Adds Experienced Global VP Sales and Marketing to its World-Class Team"; Canada NewsWire; Apr. 9, 2008.
Trappey, Amy; "Design and Analysis of a Rule Based Knowledge"; International Journal of Manufacturing Tech; Dec. 2007; 35,3-4:385-93.
Office Action issued in U.S. Appl. No. 12/333,146 on Feb. 2, 2012; 21 pages.
Notice of Allowance issued in U.S. Appl. No. 11/323,634 on Jan. 25, 2012; 5 pages.
Notice of Allowance in U.S. Appl. No. 12/233,462 on Apr. 5, 2012; 7 pages.
Notice of Allowance issued in U.S. Appl. No. 12/233,289 on Feb. 15, 2012; 11 pages.
Notice of Allowance issued in U.S. Appl. No. 12/327,701 on Apr. 6, 2012; 9 pages.
Notice of Allowance issued in U.S. Appl. No. 12/233,087 on Mar. 30, 2012; 30 pages.
Notice of Allowance issued in U.S. Appl. No. 11/396,259 on Mar. 15, 2012; 7 pages.
Notice of Allowance issued in U.S. Appl. No. 11/396,258 on Feb. 3, 2012; 12 pages.
Notice of Allowance issued in U.S. Appl. No. 11/322,851 on Mar. 1, 2012; 9 pages.
Notice of Allowance issued in U.S. Appl. No. 11/397,026 on Feb. 23, 2012; 8 pages.
Office Action issued in U.S. Appl. No. 11/967,489 on Feb. 6, 2012; 9 pages.
Office Action issued in U.S. Appl. No. 11/967,387 on Apr. 12, 2012; 13 pages.
Office Action issued in U.S. Appl. No. 12/327,737 on Mar. 26, 2012; 14 pages.
Notice of Allowance issued in U.S. Appl. No. 12/233,075 on Mar. 22, 2012; 25 pages.

* cited by examiner

FOUNDATION LAYER FOR SERVICES BASED ENTERPRISE SOFTWARE ARCHITECTURE

BACKGROUND

This specification relates to data processing systems implemented on computers, and more particular to data processing systems providing services in the nature of web services.

Enterprise software systems are generally large and complex. Such systems can require many different components, distributed across many different hardware platforms, possibly in several different geographical locations. Thus, the architecture of a large software application, i.e., what its components are and how they fit together, is an important aspect of its design for a successful implementation.

Web services are one technology for making the functionality of software applications available to other software, including other applications. A web service is a standards-based way of encapsulating the functionality of an application that other applications can locate and access. A service-oriented architecture is a distributed software model within which functionality is defined as independent web services. Within a service-oriented architecture, web services can be used in defined sequences according to business logic to form applications that enable business processes.

SUMMARY

This specification describes the foundation layer for a services architecture design for implementing services-based applications having various functionality at the level of an enterprise application.

In its various aspects, the invention can be embodied in systems, methods, and computer program products. For example, a system in one embodiment implements a services architecture design that provides foundation layer functionality for enterprise applications. The design includes service operations, data objects, and process components. Business objects can also be included. Particular embodiments can be replicated and synchronized on multiple computer hardware platforms that are distinct and separate from each other to support a software application deployed in distinct aspects on the separate hardware platforms.

The subject matter described in this specification can be implemented to realize one or more of the following advantages. Effective use is made of process components as units of software reuse, to provide a design that can be implemented reliably in a cost effective way. Effective use is made of deployment units, each of which is deployable on a separate computer hardware platform independent of every other deployment unit, to provide a scalable design. Service interfaces of the process components define a pair-wise interaction between pairs of process components that are in different deployment units in a scalable way.

Details of one or more implementations of the subject matter described in this specification are set forth in the accompanying drawings and in the description below. Further features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
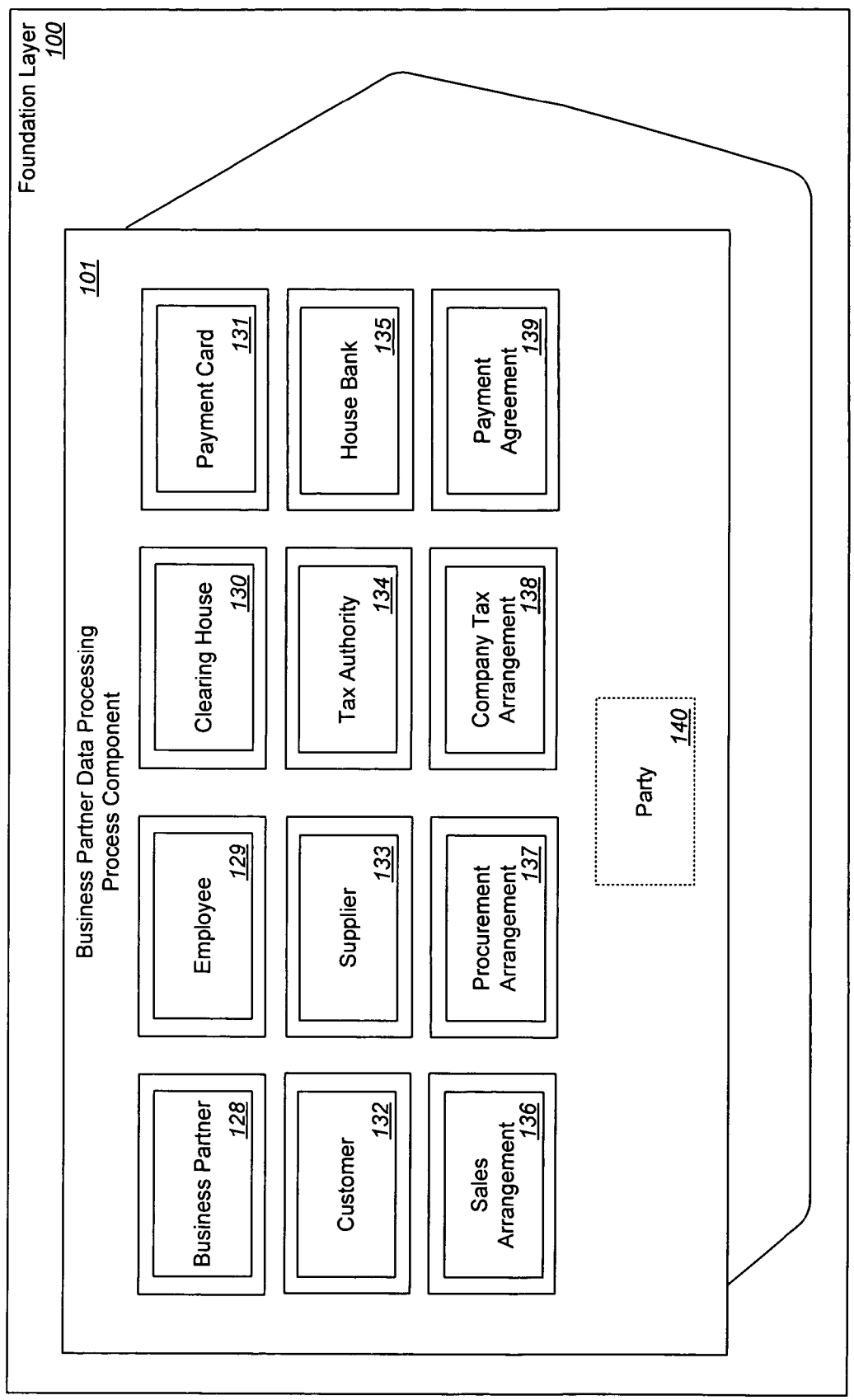
FIGS. 1A, 1B, 1C, 1D, 1E, 1F, 1G, 1H, 1I and 1J collectively illustrate a foundation layer in accordance with one implementation of the invention.
Figure 1B:
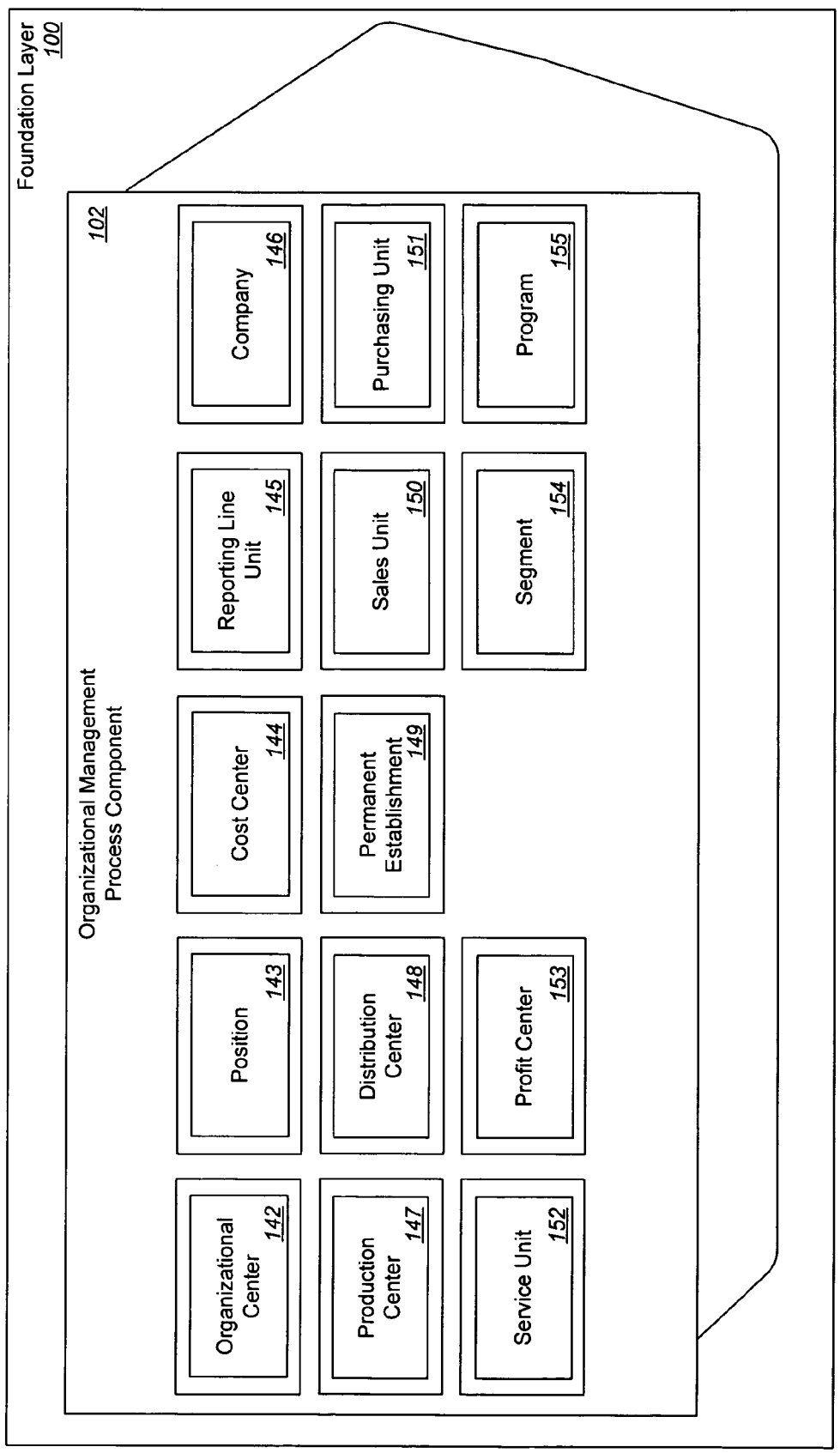
Figure 1C:
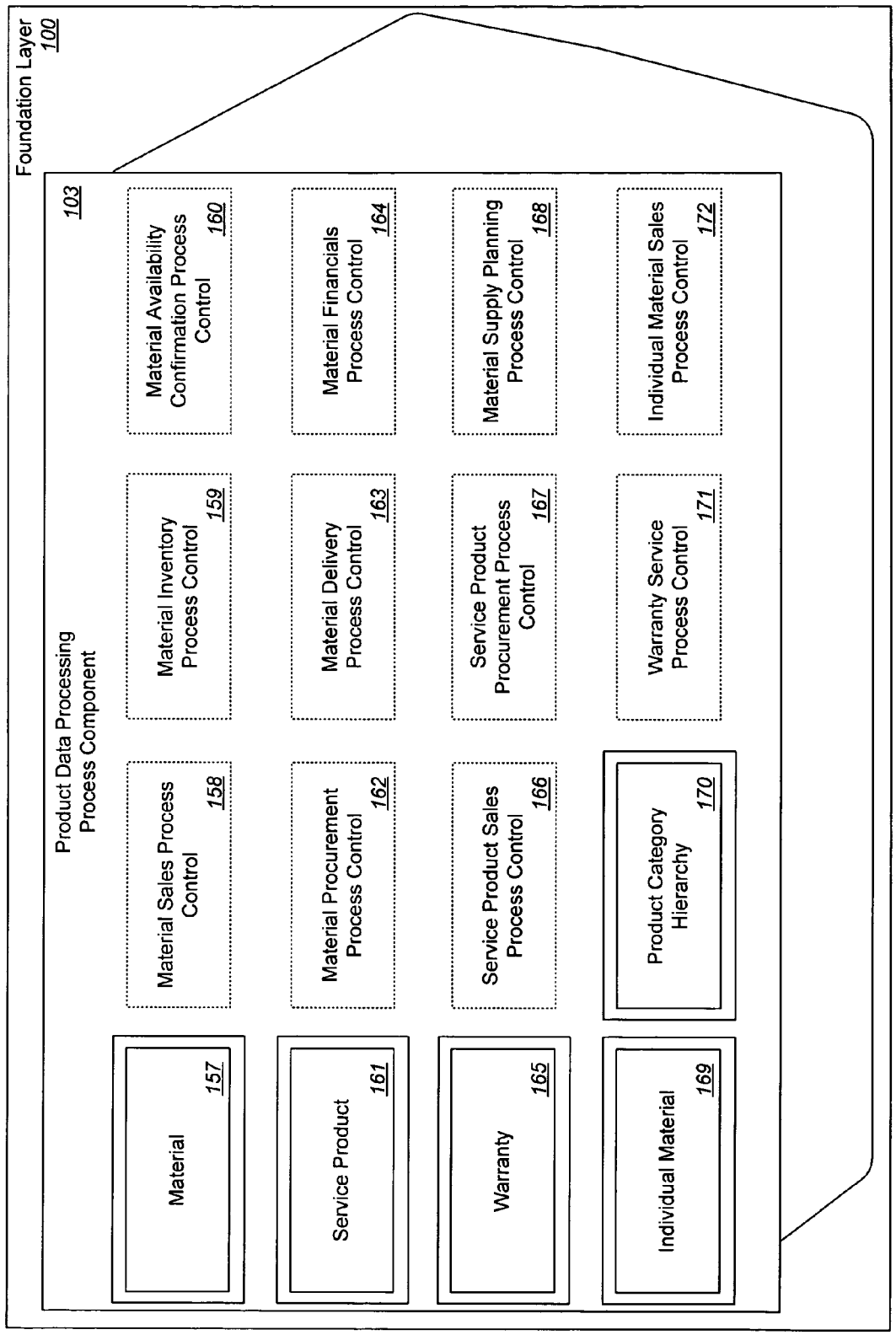

FIGS. 1A, 1B, 1C, 1D, 1E, 1F, 1G, 1H, 1I and 1J collectively illustrate a foundation layer 100 in accordance with one implementation of the invention. The foundation layer can be used to support application software deployed in an application layer. In particular, the foundation layer can be used in connection with application software implemented in accordance with a software architecture that provides a suite of enterprise service operations having various application functionality.

The elements of the architecture include the business object, the process component, the service operation (or simply, the operation), the service interface, the message, and the deployment unit. The elements can also include process agents and reuse service components. These will be generally described below.

In one implementation, the application software is implemented to be deployed on an application platform that includes a foundation layer that contains all fundamental entities that can used from multiple deployment units. These entities can be process components, business objects and reuse service components. A reuse service component is a piece of software that is reused in different transactions. A reuse service component is used by its defined interfaces, which can be, e.g., local APIs (Application Programming Interfaces) or service interfaces.

The elements of the architecture can be implemented to realize a software application that implements enterprise application service interfaces. The elements of the architecture are at times described in this specification as being contained or included in other elements; for example, a process component is described as being contained in a deployment unit. It should be understood, however, that such operational inclusion can be realized in a variety of ways and is not limited to a physical inclusion of the entirety of one element in another.

The architectural elements include the business object. A business object is a representation of a type of a uniquely identifiable business entity (an object instance) described by a structural model. Processes operate on business objects.

A business object represents a specific view on some well-defined business content. A business object represents content, and instances of business objects include content, which a typical business user would expect and understand with little explanation. Whether an object as a type or an instance of an object is intended by the term is generally clear from the context, so the distinction will be made explicitly only when necessary. Properly implemented, business objects are implemented free of redundancies.

Business objects are further categorized as business process objects, master data objects, mass data run objects, dependent objects, and transformed objects. A master data object is an object that encapsulates master data (i.e., data that is valid for a period of time). A business process object, which is the kind of business object generally found in a process component, is an object that encapsulates transactional data (i.e., data that is valid for a point in time). A mass data run object is an application object that executes an algorithm for a particular mass data run. An instance of a mass data run object contains a particular set of selections and parameters.

A mass data run object implements an algorithm that modifies, manages, and/or processes a large amount of data in multiple transactions, possibly but not necessarily with parallel processing. A dependent object is a business object used as a reuse part in another business object. A dependent object represents a concept that cannot stand by itself from a business point of view. Instances of dependent objects only occur in the context of a non-dependent business object. A transformed object is a transformation of multiple business objects for a well-defined purpose. It transforms the structure of multiple business objects into a common structure. A transformed object does not have own persistency.

The architectural elements also include the process component. A process component is a software package that realizes a business process and generally exposes its functionality as services. The functionality contains business transactions. A process component contains one or more semantically related business objects. Any business object belongs to no more than one process component.

Process components are modular and context-independent. That they are context-independent means that a process component is not specific to any specific application and is reusable. The process component is the smallest (most granular) element of reuse in the architecture.

The architectural elements also include the operation. An operation belongs to exactly one process component. A process component generally has multiple operations. Operations can be synchronous or asynchronous, corresponding to synchronous or asynchronous process agents, which will be described below. An operation is the smallest, separately-callable function, described by a set of data types used as input, output, and fault parameters, or some combination of them, serving as a signature. For convenience in supporting use of the operations supported by a system implementing elements of the design, such a system can optionally include a repository of service descriptions that includes a standards-based description of each of the supported service operations.

The architectural elements also include the service interface, which may be referred to simply as an interface. An interface is a named group of operations. Each operation belongs to exactly one interface. An interface belongs to exactly one process component. A process component might contain multiple interfaces. In one implementation, an interface contains only inbound or outbound operations, but not a mixture of both. One interface can contain both synchronous and asynchronous operations. All operations of the same type (either inbound or outbound) which belong to the same message choreography will preferably belong to the same interface. Thus, generally, all outbound operations to the same other process component are in one interface.

The architectural elements also include the message. Operations transmit and receive messages. Any convenient messaging infrastructure can be used. A message is information conveyed from one process component instance to another, with the expectation that activity will ensue. An operation can use multiple message types for inbound, outbound, or error messages. When two process components are in different deployment units, invocation of an operation of one process component by the other process component is accomplished by an operation on the other process component sending a message to the first process component.

The architectural elements also include the process agent. Process agents do business processing that involves the sending or receiving of messages. Each operation will generally have at least one associated process agent. A process agent can be associated with one or more operations. Process agents can be either inbound or outbound, and either synchronous or asynchronous.

Asynchronous outbound process agents are called after a business object changes, e.g., after a create, update, or delete of a business object instance.

Synchronous outbound process agents are generally triggered directly by a business object.

An output process agent will generally perform some processing of the data of the business object instance whose change triggered the event. An outbound agent triggers subsequent business process steps by sending messages using well-defined outbound services to another process component, which generally will be in another deployment unit, or to an external system. An outbound process agent is linked to the one business object that triggers the agent, but it is sent not to another business object but rather to another process component. Thus, the outbound process agent can be implemented without knowledge of the exact business object design of the recipient process component.

Inbound process agents are called after a message has been received. Inbound process agents are used for the inbound part of a message-based communication. An inbound process agent starts the execution of the business process step requested in a message by creating or updating one or multiple business object instances. An inbound process agent is not the agent of a business object but of its process component. An inbound process agent can act on multiple business objects in a process component.

Synchronous agents are used when a process component requires a more or less immediate response from another process component, and is waiting for that response to continue its work.

Operations and process components are described in this specification in terms of process agents. However, in alternative implementations, process components and operations can be implemented without use of agents using other conventional techniques to perform the functions described in this specification.

The architectural elements also include the deployment unit. A deployment unit includes one or more process components and, optionally, one or more business objects, that are deployed together on a single computer system platform. Conversely, separate deployment units can be deployed on separate physical computing systems. For this reason, a deployment unit boundary defines the limits of an application-defined transaction, i.e., a set of actions that have the ACID properties of atomicity, consistency, isolation, and durability. To make use of database manager facilities, the architecture requires that all operations of such a transaction be performed on one physical database; as a consequence, the processes of such a transaction must be performed by the process components of one instance of one deployment unit.

The process components of one deployment unit interact with those of another deployment unit using messages passed through one or more data communication networks or other suitable communication channels. Thus, a deployment unit deployed on a platform belonging one business can interact with a deployment unit software entity deployed on a separate platform belonging to a different and unrelated business, allowing for business-to-business communication. More than one instance of a given deployment unit can execute at the same time, on the same computing system or on separate physical computing systems. This arrangement allows the functionality offered by a deployment unit to be scaled to meet demand by creating as many instances as needed.

Since interaction between deployment units is through service operations, a deployment unit can be replaced by other another deployment unit as long as the new deployment unit supports the operations depended upon by other deployment units. Thus, while deployment units can depend on the external interfaces of process components in other deployment units, deployment units are not dependent on process component interactions (i.e., interactions between process components involving their respective business objects, operations, interfaces, and messages) within other deployment units. Similarly, process components that interact with other process components or external systems only through messages, e.g., as sent and received by operations, can also be replaced as long as the replacement supports the operations of the original.

Interactions between process components that occur only within a deployment unit are not constrained to using service operations. These can be implemented in any convenient fashion.

In contrast to a deployment unit, the foundation layer does not define a limit for application-defined transactions. Deployment units communicate directly with entities in the foundation layer, which communication is typically not message based. The foundation layer is active in every system instance on which the application is deployed. Business objects in the foundation layer are generally master data objects. In addition, the foundation layer may include some business process objects that are used by multiple deployment units. Master data objects and business process objects that should be specific to a deployment unit should be assigned to their respective deployment unit.

FIGS. 1A, 1B, 1C, 1D, 1E, 1F, 1G, 1H, 1I and 1J collectively illustrate a foundation layer in accordance with one implementation of the invention. The Foundation Layer 100 includes: a Business Partner Data Processing process component 101, an Organizational Management process component 102, a Product Data Processing process component 103, a Resource Data Processing process component 104, a Location Data Processing process component 105, a Logistics Storage Data Processing process component 106, an Inspection Master Data Processing process component 107, a Business Document Flow Processing process component 108, a Document Management process component 109, a Production Model Processing process component 110, a Site Logistics Model Processing process component 111, an Activity Management process component 112, a Source of Supply Determination process component 113, a Software Problem Reporting process component 114, an Installed Base Data Processing process component 115, a Price Master Data Management process component 116, an Identity Management process component 117, a Pricing Engine process component 118, an Engineering Change Processing process component 119, a Financial Market Data Management process component 120, a Date and Time process component 121, a Currency Conversion process component 122, a Quantity Conversion process component 123, a Payment Card Authorization process component 124, a Payment Authorization process component 125, and a Document Flow Processing process component 126.

The Business Partner Data Processing process component 101 (FIG. 1A) enables a company to manage all business partner data that is relevant to control its business processes, such as sales, purchasing and accounting processes. The Business Partner Data Processing process component 101 includes: a Business Partner master data object 128, an Employee master data object 129, a Clearing House master data object 130, a Payment Card master data object 131, a Customer master data object 132, a Supplier master data object 133, a Tax Authority master data object 134, a House Bank master data object 135, a Sales Arrangement master data object 136, a Procurement Arrangement master data object 137, a Company Tax Arrangement master data object 138, a Payment Agreement master data object 139, and a Party transformed object 140.

The Business Partner master data object 128 represents a person, organization or group of persons in which a company has a business interest. The Employee master data object 129 represents a person who contributes or has contributed to the creation of goods or services for a company. The Clearing House master data object 130 represents an organization which provides the services concerning credit card payments. The Payment Card master data object 131 represents a payment medium. The Customer master data object 132 represents a business partner with whom a business relationship exists. The Supplier master data object 133 represents a business partner who provides materials and/or services. The Tax Authority master data object 134 represents a business partner for value added tax declaration. The House Bank master data object 135 represents a business partner providing services for our company, such as account management or lock box. The Sales Arrangement master data object 136 represents an arrangement that is made by a sales unit for a customer, and is used for sales transactions. The Procurement Arrangement master data object 137 represents an arrangement that is made by a purchasing unit for a supplier, and is used for procurement transactions. The Company Tax Arrangement master data object 138 represents a contractual arrangement based on the agreement between a company and a tax authority for a tax type. The Payment Agreement master data object 139 represents the agreement between a company and a business partner concerning the handling of incoming and outgoing payments.

The Organizational Management process component 102 (FIG. 1B) provides central and unified organizational structures of the enterprise and its collaborative partners. The Organizational Management process component 102 includes: an Organizational Center master data object 142, a Position master data object 143, a Cost Center master data object 144, a Reporting Line Unit master data object 145, a Company master data object 146, a Production Center master data object 147, a Distribution Center master data object 148, a Permanent Establishment master data object 149, a Sales Unit master data object 150, a Purchasing Unit master data object 151, a Service Unit master data object 152, a Profit Center master data object 153, a Segment master data object 154, and a Program master data object 155.

The Organizational Center master data object 142 represents a building block of the enterprise model which represents a node in an organizational structure of the extended enterprise. The Position master data object 143 represents an object of the enterprise model representing a specific post in an enterprise that can be occupied by holders and is therefore a placeholder for persons in an organizational structure. The Cost Center master data object 144 represents an organizational unit that represents a defined location of cost incurrence and for which costs are recorded separately. The Reporting Line Unit master data object 145 represents the organizational unit in the personnel reporting line of the enterprise. The Company master data object 146 represents a financially and legally independent, locally unbound entity registered under business law. The Production Center master data object 147 represents an organizational unit that is responsible for organizing and executing the delivery processes as well as the processes in site logistics. The Distribution Center master data object 148 represents an organizational unit that is responsible for organizing and executing the processes in production. The Permanent Establishment master data object 149 represents an organizational unit that represents a localized subdivision of a company whose business activities are subject to uniform fiscal treatment. The Sales Unit master data object 150 represents responsible for planning, realizing and administering of sales force processes. The Purchasing Unit master data object 151 represents an organizational unit responsible for strategic and operational purchasing. The Service Unit master data object 152 represents the organizational unit responsible for processes covering all aspects of a customer service and a support center's business. The Profit Center master data object 153 represents an organizational section of the enterprise for which a separate period result is determined and used for profit-oriented rating or control of the section activities. The Segment master data object 154 represents a business branch of a company for which a closing statement (e.g., a financial statement and a profit and loss statement) is to be created based on the segment reporting regulations within the context of the particular accounting principle. The Program master data object 155 represents an organizational unit that represents a complex temporary undertaking to achieve subordinate objectives within one overall strategy.

The Product Data Processing process component 103 (FIG. 1C) enables a company to manage all product data that describes its tangible and intangible products and that is relevant to control its business processes, such as sales, purchasing, planning, production and accounting processes. The Product Data Processing process component 103 includes: a Material master data object 157, a Material Sales Process Control transformed object 158, a Material Inventory Process Control transformed object 159, a Material Availability Confirmation Process Control transformed object 160, a Service Product master data object 161, a Material Procurement Process Control transformed object 162, a Material Delivery Process Control transformed object 163, a Material Financials Process Control transformed object 164, a Warranty master data object 165, a Service Product Sales Process Control transformed object 166, a Service Product Procurement Process Control transformed object 167, a Material Supply Planning Process Control transformed object 168, an Individual Material master data object 169, a Product Category Hierarchy master data object 170, a Warranty Service Process Control transformed object 171, and an Individual Material Sales Process Control transformed object 172.

The Material master data object 157 represents a tangible product such as a sellable article, packaging, auxiliary material or expendable supplies. The Material Sales Process Control transformed object 158 represents a material, needed to control processes in presales, sales, and customer service. The Material Inventory Process Control transformed object 159 represents the control features for a material that are used in several logistics processes, especially for inventory management. The Material Availability Confirmation Process Control transformed object 160 represents the control features for a material and are used when executing the availability check. The Service Product master data object 161 represents an intangible product such as consulting and hotline service. The Material Procurement Process Control transformed object 162 represents a material that is required to use the material in procurement-relevant processes. The Material Delivery Process Control transformed object 163 represents the control features for a material required by the delivery processes in a distribution center. The Material Financials Process Control transformed object 164 represents parameters to control processes in financials applied to a material. The Warranty master data object 165 represents an intangible product such as a warranty for electronic devices and machinery. The Service Product Sales Process Control transformed object 166 represents a service product, needed to control processes in presales, sales, and customer service. The Service Product Procurement Process Control transformed object 167 represents about a service product that is required to use the service product in procurement-relevant processes. The Material Supply Planning Process Control transformed object 168 represents the control features for a material that are required to control procurement planning. The Individual Material master data object 169 represents a tangible product. The Product Category Hierarchy master data object 170 represents a hierarchy for structuring product categories. The Warranty Service Process Control transformed object 171 represents a warranty needed to control processes in customer service. The Individual Material Sales Process Control transformed object 172 represents an individual material, needed to control processes in presales, sales, and customer service.

Figure 1D:
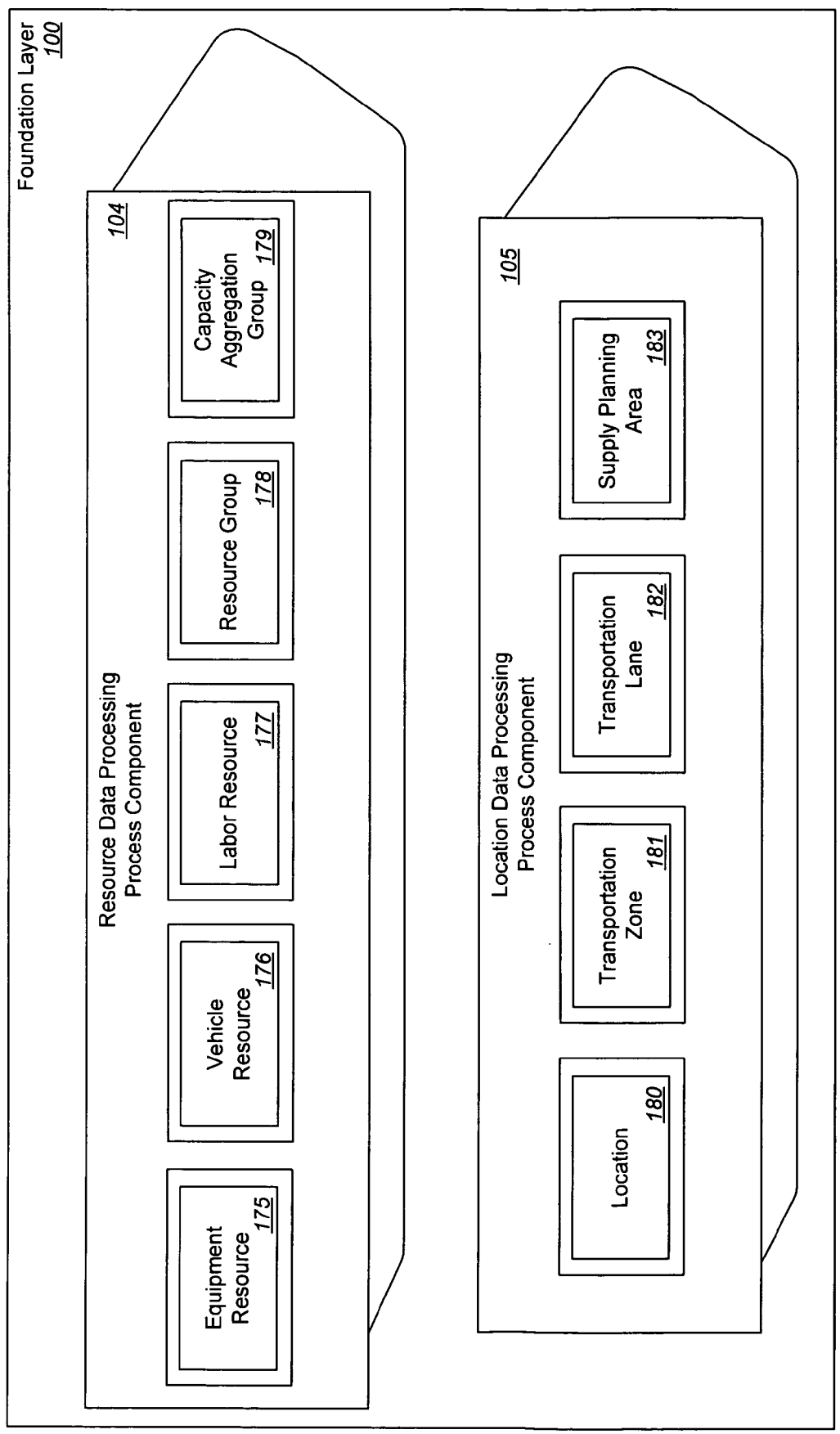
Figure 1E:
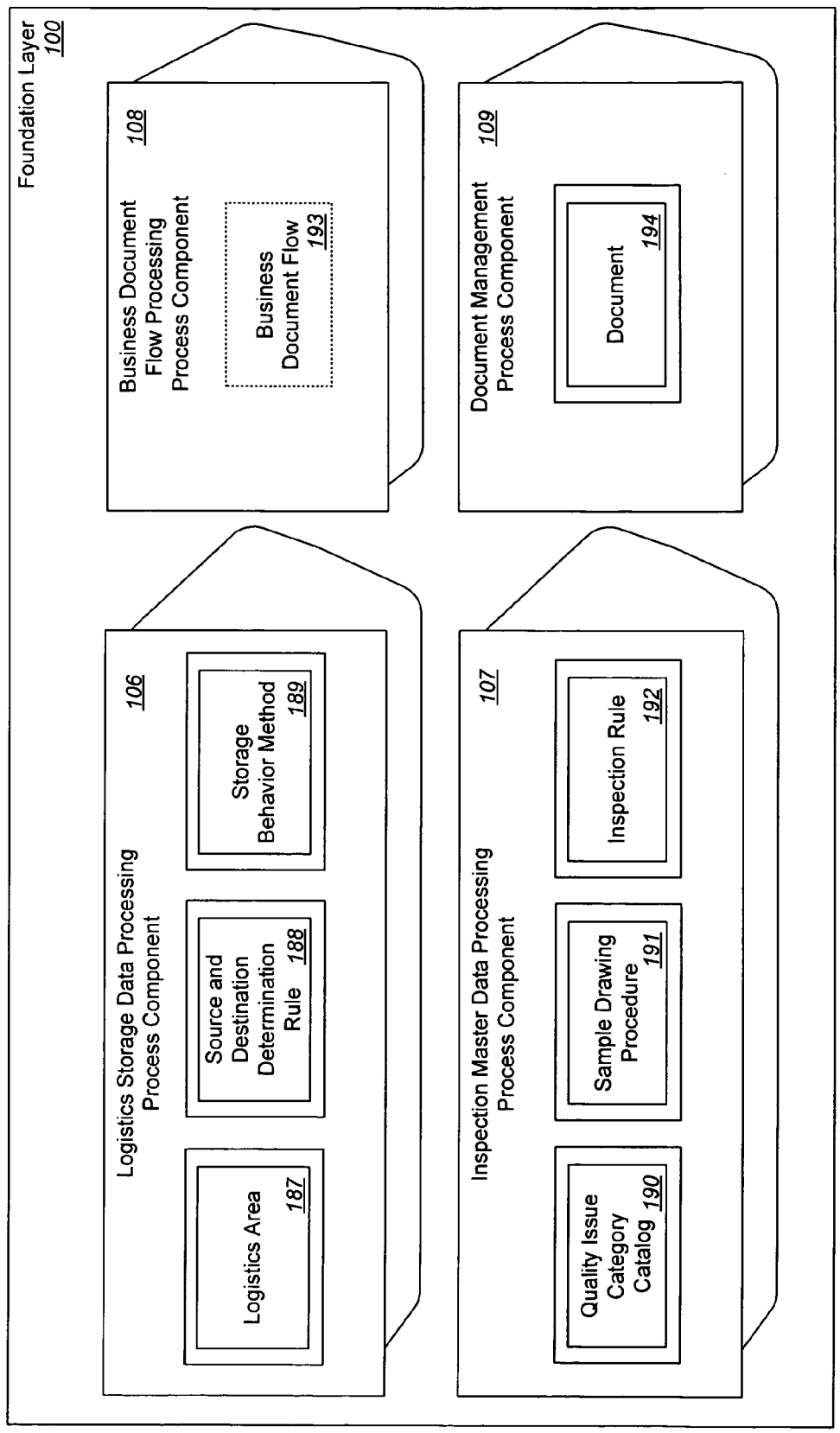
Figure 1F:
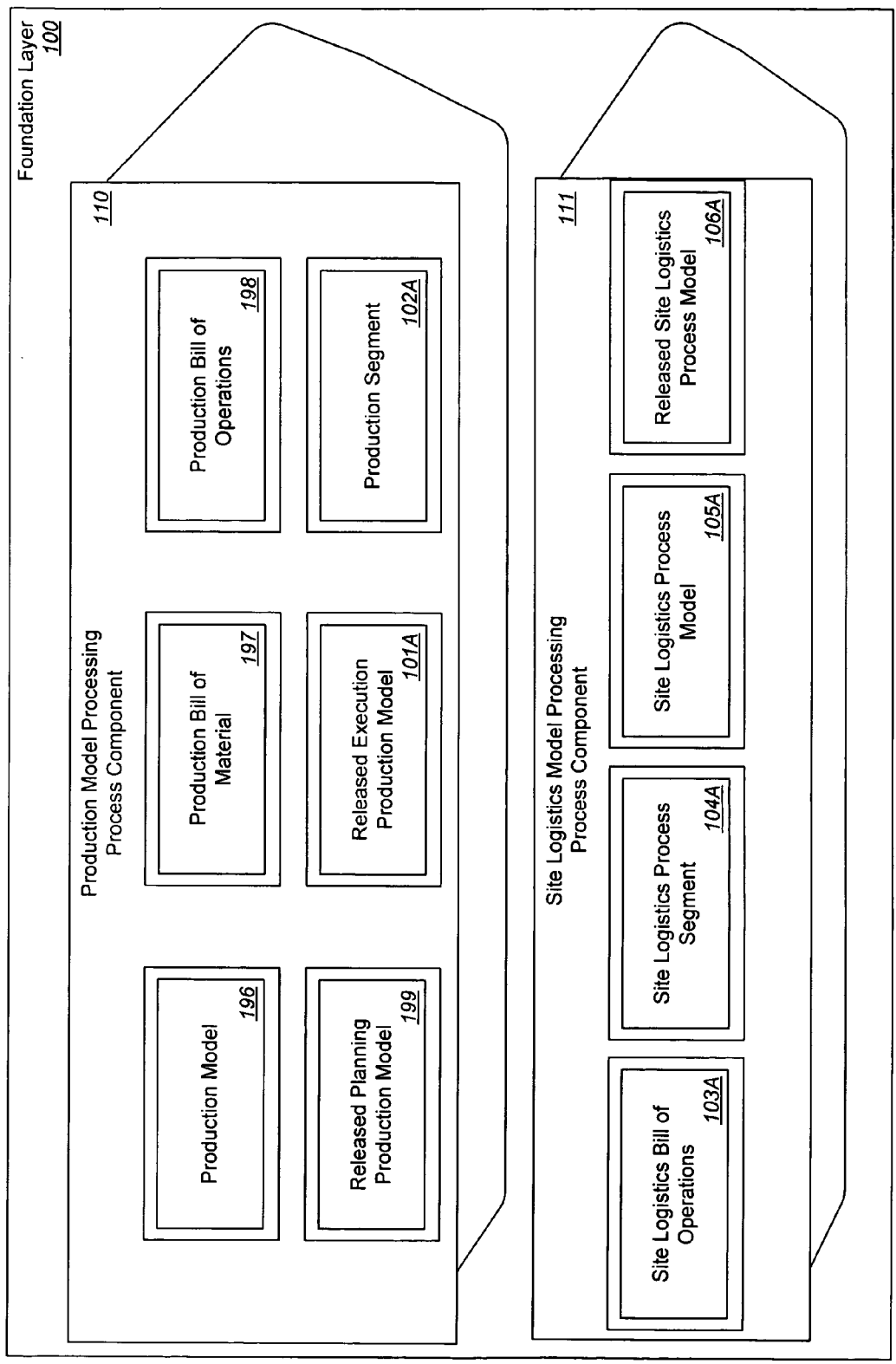
Figure 1G:
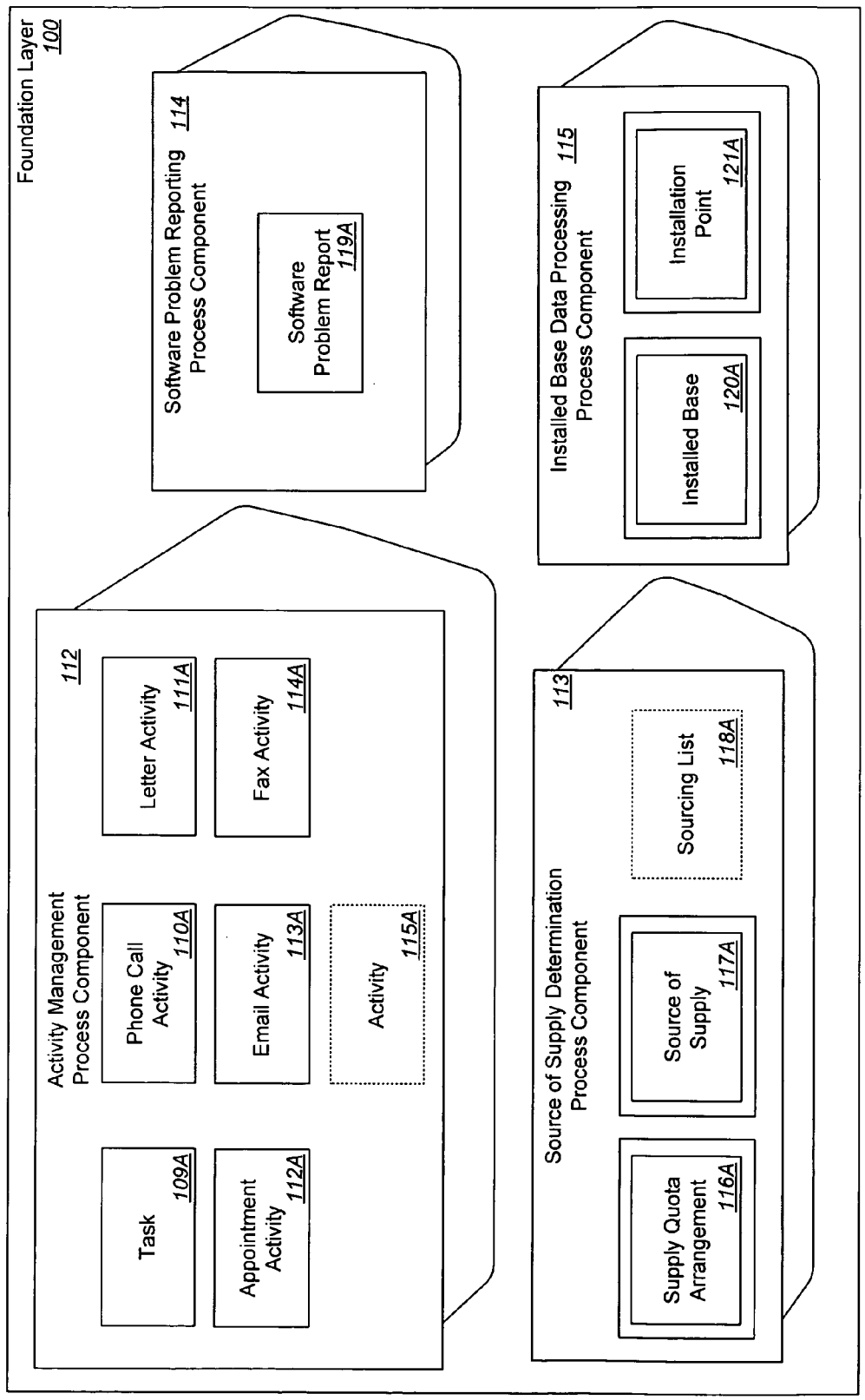
Figure 1H:
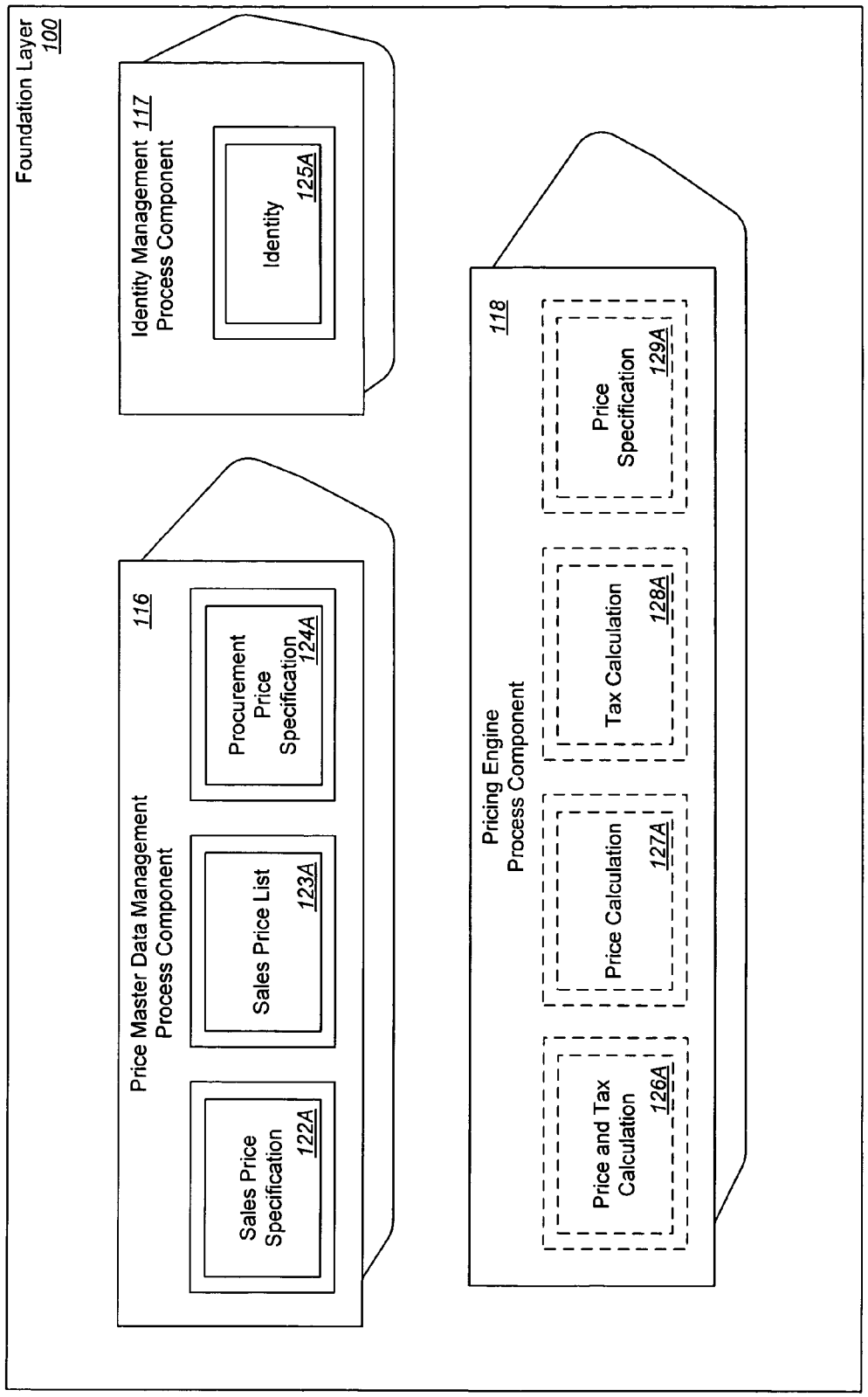
Figure 1I:
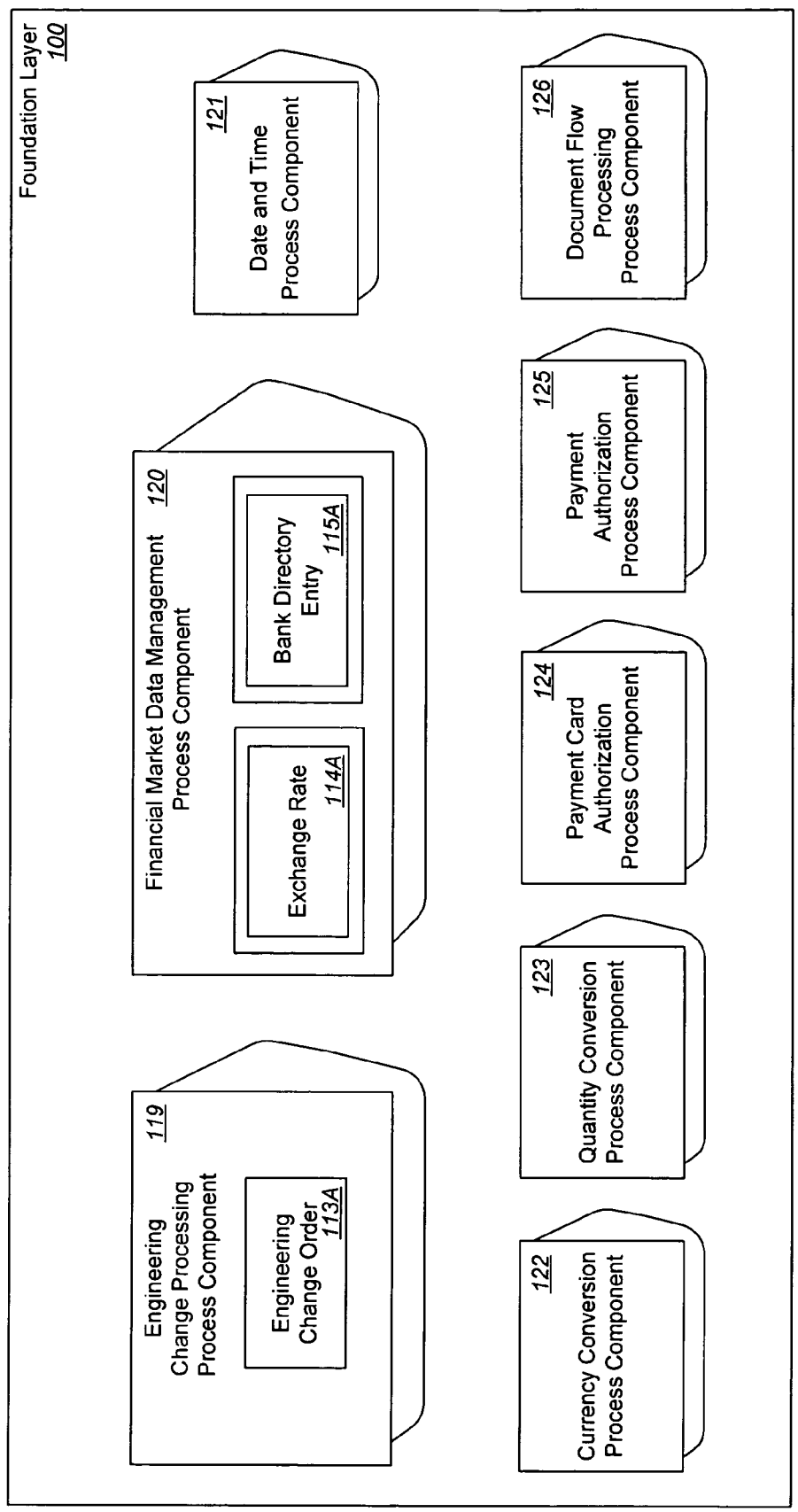

The Resource Data Processing process component 104 (FIG. 1D). The Resource Data Processing process component 104 includes: an Equipment Resource master data object 175, a Vehicle Resource master data object 176, a Labor Resource master data object 177, a Resource Group master data object 178, and a Capacity Aggregation Group master data object 179. The Equipment Resource master data object 175 represents a permanently installed operating facility or a group of identical operating facilities providing capacity to perform specific services. The Vehicle Resource master data object 176 represents a means of transportation or a group of identical means of transportation providing capacity to perform transportation services. The Labor Resource master data object 177 represents an employee or a group of employees with the same skills and qualifications that provides capacity to operate specific devices or to perform specific tasks. The Resource Group master data object 178 represents a grouping of individual resources that provide similar services or have similar physical and functional characteristics. The Capacity Aggregation Group master data object 179 represents the total of the capacities of several resources that provide identical services and can be used for logistics or production planning and scheduling purposes.

The Location Data Processing process component 105 (FIG. 1D) includes: a Location master data object 180, a Transportation Zone master data object 181, a Transportation Lane master data object 182, and a Supply Planning Area master data object 183. The Location master data object 180 represents a geographical place used, for example, for communication of place information in business processes. The Transportation Zone master data object 181 represents geographical locations that may be considered collectively for modeling or planning transportation routes or transportations. The Transportation Lane master data object 182 represents a connection between two locations in a supply chain model used for planning cross-location product movements. The Supply Planning Area master data object 183 represents groups of requirements, stocks and other requirements coverage elements with the purpose of being together taken into account in net requirements calculation of supply planning.

The Logistics Storage Data Processing process component 106 (FIG. 1E) 106 includes: a Logistics Area master data object 187, a Source and Destination Determination Rule master data object 188, and a Storage Behavior Method master data object 189. The Logistics Area master data object 187 represents an object that describes the internal structure of a logistics facility (e.g., warehouse or production). The Source and Destination Determination Rule master data object 188 represents a rule to determine the search method for locating the source for stock retrieval or the destination for stock storage. The Storage Behavior Method master data object 189 represents a set of rules distinguished by the manner in which a logistics area or resource is managed (e.g., picking area).

The Inspection Master Data Processing process component 107 (FIG. 1E) handles the processing of inspection relevant master data like inspection rules, sample drawing procedures and the definition of quality relevant category catalogs. The Inspection Master Data Processing process component 107 includes: a Quality Issue Category Catalog master data object 190, a Sample Drawing Procedure master data object 191, and an Inspection Rule master data object 192. The Quality Issue Category Catalog master data object 190 represents a catalogue of quality issues for the rating of different aspects of quality management (e.g., inspection decisions or inspection findings in the quality inspection process). The Sample Drawing Procedure master data object 191 represents how samples are taken for an inspection, such as the number, quantity, and subcategory of samples. The Inspection Rule master data object 192 represents how an inspection of a given object must be performed.

The Business Document Flow Processing process component 108 (FIG. 1E) includes a Business Document Flow transformed object 193. The Business Document Flow transformed object 193 represents a view on the flow of business transaction documents.

The Document Management process component 109 (FIG. 1E) includes a Document master data object 194. The Document master data object 194 represents a carrier of electronic information, including control and monitoring information.

The Production Model Processing process component 110 (FIG. 1F) combines all the tasks required to maintain master data for the planned production order and the production order. The Production Model Processing process component 110 includes: a Production Model master data object 196, a Production Bill of Material master data object 197, a Production Bill of Operations master data object 198, a Released Planning Production Model master data object 199, a Released Execution Production Model master data object 101A, and a Production Segment master data object 102A. The Production Model master data object 196 represents a model of a production process in a production center that is specified by a network of production segments. The Production Bill of Material master data object 197 represents a complete, structured list of the components that make up a product or a family of similar products. The Production Bill of Operations master data object 198 represents a detailed description of how a product is to be produced. The Released Planning Production Model master data object 199 represents a released version of a production model in a production center that contains all details from the production bill of operations and production bill of material necessary for the planning of a production process. The Released Execution Production Model master data object 101A represents a released version of a production model in a production center that contains all details from the production bill of operations and production bill of material necessary for the execution of a production process. The Production Segment master data object 102A represents part of a production process in a production center specified by a network of operations and assigned materials for the production of a material.

The Site Logistics Model Processing process component 111 (FIG. 1F) includes: a Site Logistics Bill of Operations master data object 103A, a Site Logistics Process Segment master data object 104A, a Site Logistics Process Model master data object 105A, and a Released Site Logistics Process Model master data object 106A. The Site Logistics Bill of Operations master data object 103A represents a detailed description of how a product is to be moved, packed and otherwise dealt with during site logistics processing. The Site Logistics Process Segment master data object 104A represents a set of operations for moving, packing or checking stock in a logistics division, which specifies a segment of a site logistics process. The Site Logistics Process Model master data object 105A represents a model that defines a logistic process managed by a logistics division, by specifying a sequence of process segments. The Released Site Logistics Process Model master data object 106A represents a structure that defines a logistic process in a logistics division by specifying a sequence of process segments.

The Activity Management process component 112 (FIG. 1G) is used to record public interactions, that is, activities undertaken on behalf of a company. The Activity Management process component 112 includes: a Task business process object 109A, a Phone Call Activity business process object 110A, a Letter Activity business process object 111A, an Appointment Activity business process object 112A, an Email Activity business process object 113A, a Fax Activity process business object 114A, and an Activity transformed object 115A. The Task business process object 109A represents a piece of daily business work or a notification about a business event. The Phone Call Activity business process object 110A represents a type of activity that records telephone interactions that are undertaken by employees on behalf of their company. The Letter Activity business process object 111A represents a type of activity that records messages written on paper by employees on behalf of their company. The Appointment Activity business process object 112A represents different types of planned activities that are maintained in an employee's calendar, including external appointments and scheduled meetings with other business parties. The Email Activity business process object 113A represents a type of activity that records messages written on paper by employees on behalf of their company. The Fax Activity process business object 114A represents a type of activity that records documents or graphics transmitted over a telecommunications facility by employees on behalf of their company. The Activity transformed object 115A represents an activity that can be performed by employees on behalf of their company.

The Source of Supply Determination process component 113 (FIG. 1G) enables maintenance and access to sources of supply and quota arrangements for external and internal procurement processes. The Source of Supply Determination process component 113 includes a Supply Quota Arrangement master data object 116A, a Source of Supply master data object 117A, and a Sourcing List transformed object 118A. The Supply Quota Arrangement master data object 116A represents a distribution of material requirements or goods to different sources of supply, business partners, or organizational units within ones own company. The Source of Supply master data object 117A represents an object that describes a logical link between a possible source of products and a possible target. The Sourcing List transformed object 118A represents supply arrangements and supply sources.

The Software Problem Reporting process component 114 (FIG. 1G) is used for collecting context data in a centric IT solution in case of an incident, summarizing these data in a software problem report, and sending the report to the appropriate service desk. The Software Problem Reporting process component 114 includes a Software Problem Report business process object 119A. The Software Problem Report business process object 119A represents a report about a computer software incident.

The Installed Base Data Processing process component 115 (FIG. 1G) enables a company to manage and structure business objects within installations by their logical or physical location concerning functional aspects. The Installed Base Data Processing process component 115 includes an Installed Base master data object 120A and an Installation Point master data object 121A. The Installed Base master data object 120A represents a container that holds structured information of business components and their compositions, as well as their business features. The Installation Point master data object 121A represents the time-dependent assignment of a business component to installed bases.

The Price Master Data Management process component 116 (FIG. 1H) includes: a Sales Price Specification master data object 122A, a Sales Price List master data object 123A and a Procurement Price Specification master data object 124A. The Sales Price Specification master data object 122A represents the specification of a price, discount or surcharge to be used in sales and service documents. The Sales Price List master data object 123A represents a list of price specifications with respect to common identifying criteria. The Procurement Price Specification master data object 124A represents the specification of a price, discount or surcharge to be used in procurement documents.

The Identity Management process component 117 (FIG. 1H) includes an Identity master data object 125A. The Identity master data object 125A represents a set of attributes identifying a person together with all of his user accounts in a system landscape.

The Pricing Engine process component 118 (FIG. 1H) includes: a Price and Tax Calculation dependent object 126A, a Price Calculation dependent object 127A, a Tax Calculation dependent object 128A, and a Price Specification dependent object 129A. The Price and Tax Calculation dependent object 126A represents the summarization of the determined and calculated price and tax elements of a business case. The Price Calculation dependent object 127A represents the summarization of the determined and calculated price elements of a business case. The Tax Calculation dependent object 128A represents the summarization of the determined and calculated tax elements of a business case. The Price Specification dependent object 129A represents the specification of a price, discount or surcharge to be used in procurement documents.

The Engineering Change Processing process component 119 (FIG. 1I) is the definition and processing of change management parameters for business objects in the product lifecycle phases engineering and manufacturing. The Engineering Change Processing process component 119 includes an Engineering Change Order business process object 131A. The Engineering Change Order business process object 131A represents an object that controls the alteration of different objects over time and their usage by means of other parameters.

The Financial Market Data Management process component 120 (FIG. 1I) integrates all data and activities concerning financial market data provided by generally accepted agencies. The Financial Market Data Management process component 120 includes an Exchange Rate master data object 132A and a Bank Directory Entry master data object 133A. The Exchange Rate master data object 132A represents the relative value of two different currencies for a time span. The Bank Directory Entry master data object 133A represents a bank or institution capable of performing financial transactions.

Figure 1J:
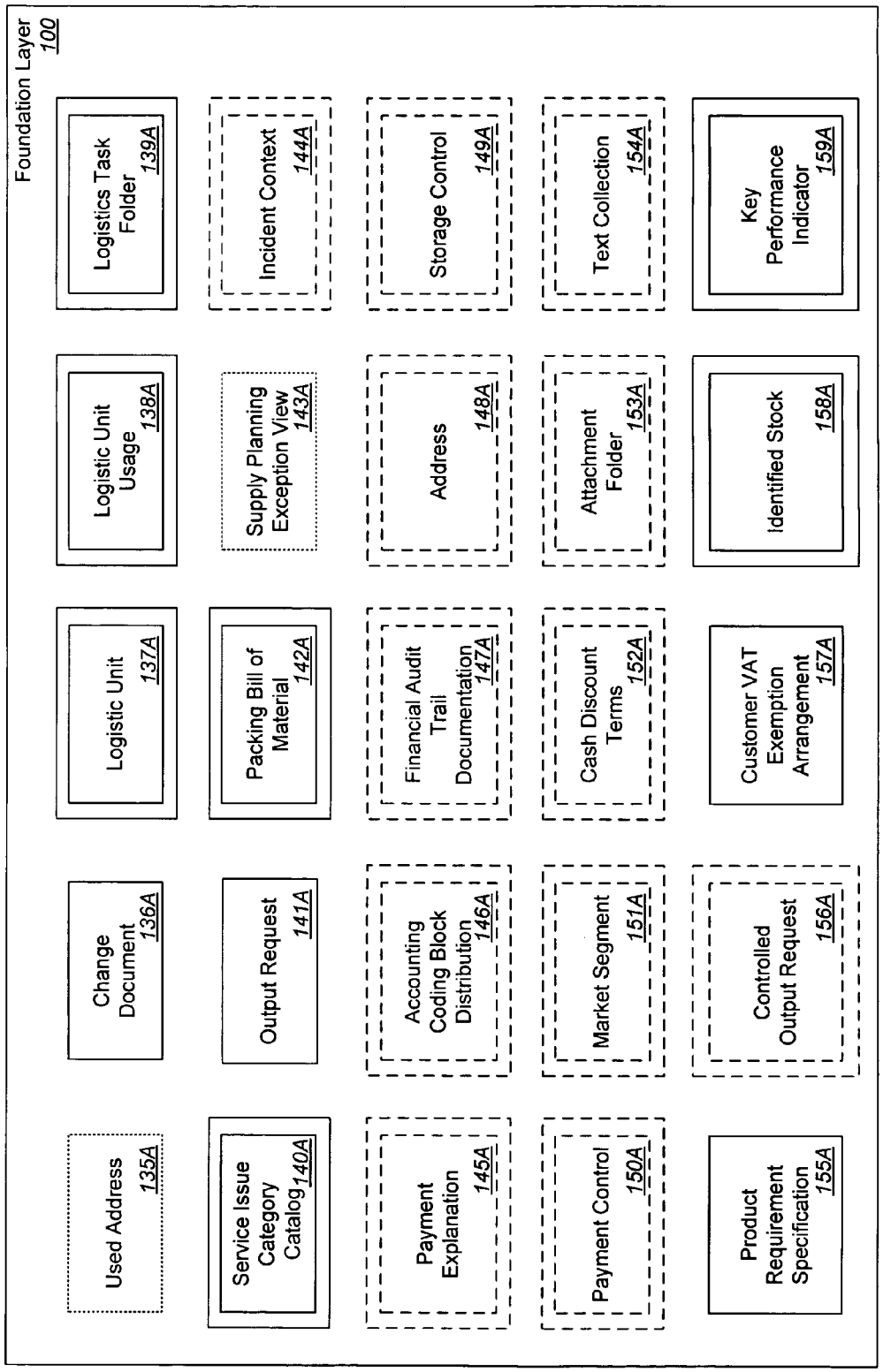

As shown in FIG. 1J, the Foundation Layer 100 also includes: a Used Address transformed object 135A, a Change Document business process object 136A, a Logistic Unit master data object 137A, a Logistic Unit Usage master data object 138A, a Logistics Task Folder master data object 139A, a Service Issue Category Catalog master data object 140A, an Output Request business process object 141A, a Packing Bill of Material master data object 142A, a Supply Planning Exception View transformed object 143A, an Incident Context dependent object 144A, a Payment Explanation dependent object 145A, an Accounting Coding Block Distribution dependent object 146A, a Financial Audit Trail Documentation dependent object 147A, an Address dependent object 148A, a Storage Control dependent object 149A, a Payment Control dependent object 150A, a Market Segment dependent object 151A, a Cash Discount Terms dependent object 152A, an Attachment Folder dependent object 153A, a Text Collection dependent object 154A, a Product Requirement Specification business process object 155A, a Controlled Output Request transformed object 156A, a Customer VAT (Value Added Tax) Exemption Arrangement business process object 157A, an Identified Stock master data object 158A, and a Key Performance Indicator master data object 159A.

The Used Address transformed object 135A represents the address data (e.g., the addressee, postal address and communication connections) used in a business transaction. The Logistic Unit master data object 137A represents an object that represents an item of any composition, which is used for storage, movement, and packing. The Logistic Unit Usage master data object 138A represents an object that represents a logistics purpose for which logistic units are grouped. The Logistics Task Folder master data object 139A represents the local work organization on the shop floor. The Service Issue Category Catalog master data object 140A represents a structured directory of issue categories that describe business transactions in customer service from an objective or subjective point of view. The Packing Bill of Material master data object 142A represents a complete and structured list of components that defines the packing structure of logistic units. The Supply Planning Exception View transformed object 143A represents an unsolved or incorrect planning situation. The Incident Context dependent object 144A represents structured information about the status of the source system where an incident is reported. The Payment Explanation dependent object 145A represents the explanation of a payment amount with regard to one or more business documents (e.g., invoices or orders). The Accounting Coding Block Distribution dependent object 146A represents the distribution of coding blocks to enterprise resources changes, such as expenses or material movements. The Financial Audit Trail Documentation dependent object 147A represents the uniform documentation of a business transaction in terms of an operational component. The Address dependent object 148A represents the data that describes the addressee, postal address and communication connections. The Storage Control dependent object 149A represents the data that describes addressee, postal address and communication connections. The Payment Control dependent object 150A represents a storage related behavior scheme that specifies storage state, set of rules, and required actions. The Market Segment dependent object 151A represents a homogeneous submarket of the total market; it contains characteristics of customer, product, region, and organizational classification. The Cash Discount Terms dependent object 152A represents the modalities agreed upon between business partners for the payment of goods delivered or services provided. The Attachment Folder dependent object 153A represents a collection of all related documents for an arbitrary business object node. The Text Collection dependent object 154A represents a set of all multilingual textual descriptions, including formatting information, for a business object or a part of a business object.

Figure 2:
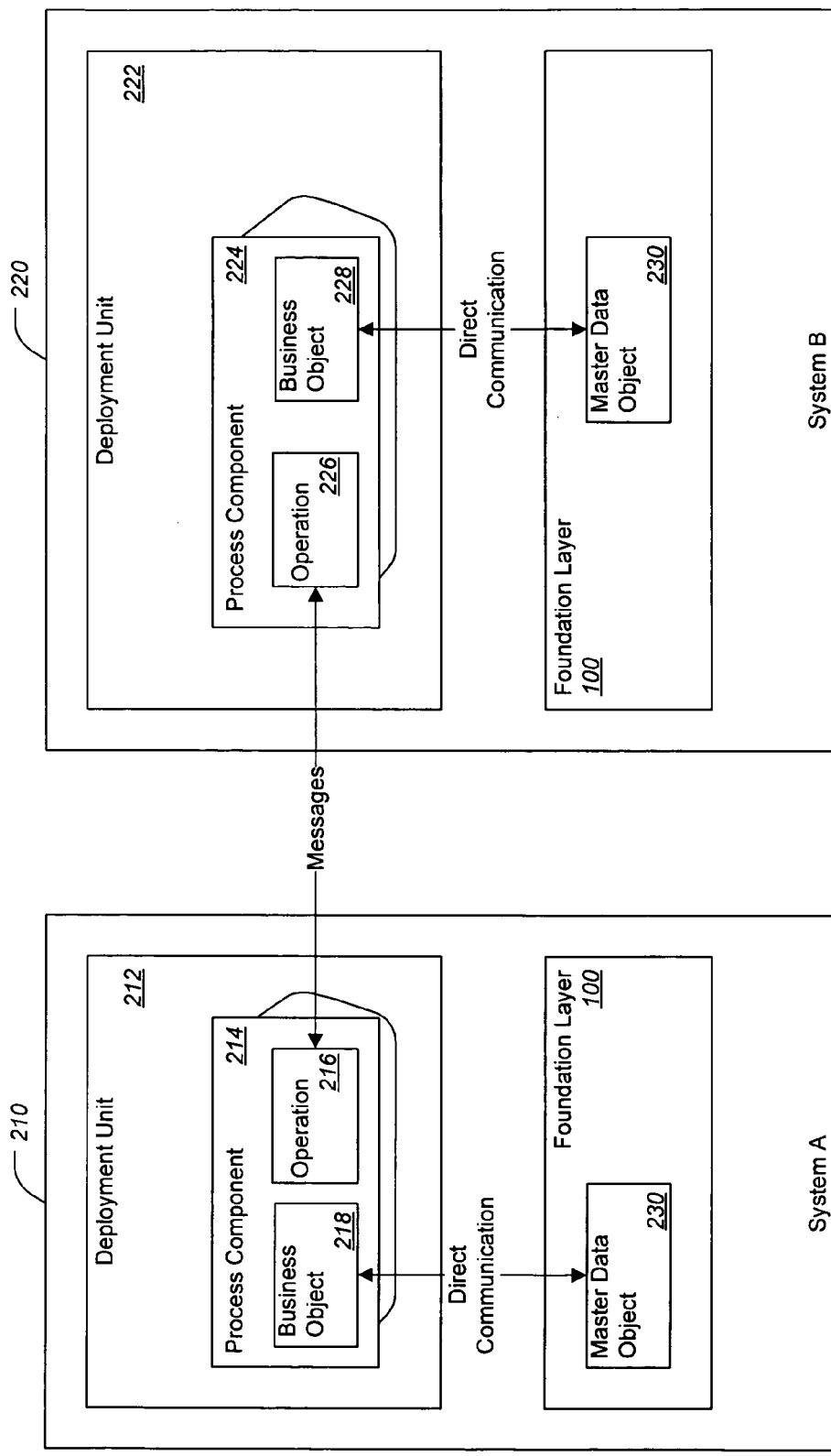
FIG. 2 illustrates a deployment of the foundation layer of FIGS. 1A, 1B, 1C, 1D, 1E, 1F, 1G, 1H, 1I and 1J in accordance with one implementation of the invention.

As shown in FIG. 2, the Foundation Layer 100 can be deployed on multiple separate and distinct hardware platforms, e.g., System A 210 and System B 220, to support application software deployed as two or more deployment units distributed on the platforms, including deployment unit 212 deployed on System A and deployment unit 222 deployed on System B. As explained above, process components in separate deployment units interact through service operations, as illustrated by messages passing between service operations 216 and 226, which are implemented in process components 214 and 224, respectively, which are included in deployment units 212 and 222, respectively. As also explained above, some form of direct communication is generally the form of interaction used between a business object, e.g., business object 218 and 228, of an application deployment unit and a business object, e.g., master data object 230, of the Foundation Layer 100.

The subject matter described in this specification and all of the functional operations described in this specification can be implemented in digital electronic circuitry, or in computer software, firmware, or hardware, including the structural means disclosed in this specification and structural equivalents thereof, or in combinations of them. The subject matter described in this specification can be implemented as one or more computer program products, i.e., one or more computer programs tangibly embodied in an information carrier, e.g., in a machine-readable storage device or in a propagated signal, for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, subprograms, or portions of code). A computer program can be deployed to be executed on one computer or on multiple computers at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The subject matter described in this specification can be implemented in a computing system that includes a back-end component (e.g., a data server), a middleware component (e.g., an application server), or a front-end component (e.g., a client computer having a graphical user interface or a Web browser through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as an exemplification of preferred embodiments of the invention. Certain features that are described in this specification in the context of separate embodiments, may also be provided in combination in a single embodiment. Conversely, various features that are described in the context of a single embodiment may also be provided in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter has been described in terms of particular variations, but other variations can be implemented and are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other variations are within the scope of the following claims.

What is claim is:

1. A system comprising:

a computer system comprising one or more hardware platforms for executing computer software; and computer software deployed on the computer system as an instance of a foundation layer, the instance of the foundation layer for use in a services architecture design for implementing services-based applications in an enterprise application, the foundation layer used to support application software deployed in an application layer deployed on the computer system, where the application software includes at least one deployment unit in the application layer, where each deployment unit includes one or more process components deployed together in a single computer system, each deployment unit defining the limits of an application-defined transaction for performing application-relevant operations, where multiple instances of a single deployment unit can be deployed on separate physical computer systems, and wherein instances of the foundation layer are operable to be deployed on each of multiple hardware platforms that are distinct and separate from each other to support the application software deployed as the instances of one or more deployment units on the multiple computer systems without duplication of instances of the deployment units in a single computer system, and wherein the instance of the foundation layer deployed on the computer system contains a set of fundamental entities used by the at least one instance of the deployment units deployed on the computer system, and wherein the instances of the deployment units deployed on the computer system communicate directly with the entities in the instance of the foundation layer deployed on the corresponding computer system, the instance of the foundation layer implementing a plurality of business objects, the business objects comprising master data objects, the master data objects comprising:

a business partner master data object, wherein the business partner master data object represents a person, organization or group of persons in which a company has a business interest;

an employee master data object, wherein the employee master data object represents a person who contributes or has contributed to the creation of goods or services for a company;

a clearing house master data object, wherein the clearing house master data object represents an organization which provides the services concerning credit card payments;

a payment card master data object, wherein the payment card master data object represents a payment medium;

a customer master data object, wherein the customer master data object represents a business partner with whom a business relationship exists;

a supplier master data object, wherein the supplier master data object represents a business partner who provides materials and/or services;

a tax authority master data object, wherein the tax authority master data object represents a business partner for value added tax declaration;

a house bank master data object, wherein the house bank master data object represents a business partner providing services for our company, such as account management or lock box;

a sales arrangement master data object, wherein the sales arrangement master data object represents an arrangement that is made by a sales unit for a customer, and is used for sales transactions;

a procurement arrangement master data object, wherein the procurement arrangement master data object represents an arrangement that is made by a purchasing unit for a supplier, and is used for procurement transactions;

a company tax arrangement master data object, wherein the company tax arrangement master data object represents a contractual arrangement based on the agreement between a company and a tax authority for a tax type;

a payment agreement master data object, wherein the payment agreement master data object represents the agreement between a company and a business partner concerning the handling of incoming and outgoing payments;

an organizational center master data object, wherein the organizational center master data object represents a building block of the enterprise model which represents a node in an organizational structure of the extended enterprise;

a position master data object, wherein the position master data object represents an object of the enterprise model representing a specific post in an enterprise that can be occupied by holders and is therefore a placeholder for persons in an organizational structure;

a cost center master data object, wherein the cost center master data object represents an organizational unit that represents a defined location of cost incurrence and for which costs are recorded separately;

a reporting line unit master data object, wherein the reporting line unit master data object represents the organizational unit in the personnel reporting line of the enterprise;

a company master data object, wherein the company master data object represents a financially and legally independent, locally unbound entity registered under business law;

a production center master data object, wherein the production center master data object represents an organizational unit that is responsible for organizing and executing the delivery processes as well as the processes in site logistics;

a distribution center master data object, wherein the distribution center master data object represents an organizational unit that is responsible for organizing and executing the processes in production;

a permanent establishment master data object, wherein the permanent establishment master data object represents an organizational unit that represents a localized subdivision of a company whose business activities are subject to uniform fiscal treatment;

a sales unit master data object, wherein the sales unit master data object represents responsible for planning, realizing and administering of sales force processes;

a purchasing unit master data object, wherein the purchasing unit master data object represents an organizational unit responsible for strategic and operational purchasing;

a service unit master data object, wherein the service unit master data object represents the organizational unit responsible for processes covering all aspects of a customer service and a support center's business;

a profit center master data object, wherein the profit center master data object represents an organizational section of the enterprise for which a separate period result is determined and used for profit-oriented rating or control of the section activities;

a segment master data object, wherein the segment master data object represents a business branch of a company for which a closing statement is to be created based on the segment reporting regulations within the context of the particular accounting principle;

a program master data object, wherein the program master data object represents an organizational unit that represents a complex temporary undertaking to achieve subordinate objectives within one overall strategy;

a material master data object, wherein the material master data object represents a tangible product such as a sellable article, packaging, auxiliary material or expendable supplies;

a service product master data object, wherein the service product master data object represents an intangible product such as consulting and hotline service;

a warranty master data object, wherein the warranty master data object represents an intangible product such as a warranty for electronic devices and machinery;

an individual material master data object, wherein the individual material master data object represents a tangible product;

a product category hierarchy master data object, wherein the product category hierarchy master data object represents a hierarchy for structuring product categories;

an equipment resource master data object, wherein the equipment resource master data object represents a permanently installed operating facility or a group of identical operating facilities providing capacity to perform specific services;

a vehicle resource master data object, wherein the vehicle resource master data object represents a means of transportation or a group of identical means of transportation providing capacity to perform transportation services;

a labor resource master data object, wherein the labor resource master data object represents an employee or a group of employees with the same skills and qualifications that provides capacity to operate specific devices or to perform specific tasks;

a resource group master data object, wherein the resource group master data object represents a grouping of individual resources that provide similar services or have similar physical and functional characteristics;

a capacity aggregation group master data object, wherein the capacity aggregation group master data object represents the total of the capacities of several resources that provide identical services and can be used for logistics or production planning and scheduling purposes;

a location master data object, wherein the location master data object represents a geographical place used, for example, for communication of place information in business processes;

a transportation zone master data object, wherein the transportation zone master data object represents geographical locations that may be considered collectively for modeling or planning transportation routes or transportations;

a transportation lane master data object, wherein the transportation lane master data object represents a connection between two locations in a supply chain model used for planning cross-location product movements;

a supply planning area master data object, wherein the supply planning area master data object represents groups of requirements, stocks and other requirements coverage elements with the purpose of being together taken into account in net requirements calculation of supply planning;

a logistics area master data object, wherein the logistics area master data object represents an object that describes the internal structure of a logistics facility;

a source and destination determination rule master data object, wherein the source and destination determination rule master data object represents a rule to determine the search method for locating the source for stock retrieval or the destination for stock storage;

a storage behavior method master data object, wherein the storage behavior method master data object represents a set of rules distinguished by the manner in which a logistics area or resource is managed;

a quality issue category catalog master data object, wherein the quality issue category catalog master data object represents a catalogue of quality issues for the rating of different aspects of quality management;

a sample drawing procedure master data object, wherein the sample drawing procedure master data object represents how samples are taken for an inspection, such as the number, quantity, and subcategory of samples;

an inspection rule master data object, wherein the inspection rule master data object represents how an inspection of a given object must be performed;

a document master data object, wherein the document master data object represents a carrier of electronic information, including control and monitoring information;

a production model master data object, wherein the production model master data object represents a model of a production process in a production center that is specified by a network of production segments;

a production bill of material master data object, wherein the production bill of material master data object represents a complete, structured list of the components that make up a product or a family of similar products;

a production bill of operations master data object, wherein the production bill of operations master data object represents a detailed description of how a product is to be produced;

a released planning production model master data object, wherein the released planning production model master data object represents a released version of a production model in a production center that contains all details from the production bill of operations and production bill of material necessary for the planning of a production process;

a released execution production model master data object, wherein the released execution production model master data object represents a released version of a production model in a production center that contains all details from the production bill of operations and production bill of material necessary for the execution of a production process;

a production segment master data object, wherein the production segment master data object represents part of a production process in a production center specified by a network of operations and assigned materials for the production of a material;

a site logistics bill of operations master data object, wherein the site logistics bill of operations master data object represents a detailed description of how a product is to be moved, packed and otherwise dealt with during site logistics processing;

a site logistics process segment master data object, wherein the site logistics process segment master data object represents a set of operations for moving, packing or checking stock in a logistics division, which specifies a segment of a site logistics process;

a site logistics process model master data object, wherein the site logistics process model master data object represents a model that defines a logistic process managed by a logistics division, by specifying a sequence of process segments;

a released site logistics process model master data object, wherein the released site logistics process model master data object represents a structure that defines a logistic process in a logistics division by specifying a sequence of process segments;

a supply quota arrangement master data object, wherein the supply quota arrangement master data object represents a distribution of material requirements or goods to different sources of supply, business partners, or organizational units within one's own company;

a source of supply master data object, wherein the source of supply master data object represents an object that describes a logical link between a possible source of products and a possible target;

an installed base master data object, wherein the installed base master data object represents a container that holds structured information of business components and their compositions, as well as their business features;

an installation point master data object, wherein the installation point master data object represents the time-dependent assignment of a business component to installed bases;

a sales price specification master data object, wherein the sales price specification master data object represents the specification of a price, discount or surcharge to be used in sales and service documents;

a sales price list master data object, wherein the sales price list master data object represents a list of price specifications with respect to common identifying criteria;

a procurement price specification master data object, wherein the procurement price specification master data object represents the specification of a price, discount or surcharge to be used in procurement documents;

an identity master data object, wherein the identity master data object represents a set of attributes identifying a person together with all of his user accounts in a system landscape;

an exchange rate master data object, wherein the exchange rate master data object represents the relative value of two different currencies for a time span;

a bank directory entry master data object, wherein the bank directory entry master data object represents a bank or institution capable of performing financial transactions;

a logistic unit master data object, wherein the logistic unit master data object represents an object that represents an item of any composition, which is used for storage, movement, and packing;

a logistic unit usage master data object, wherein the logistic unit usage master data object represents an object that represents a logistics purpose for which logistic units are grouped;

a logistics task folder master data object, wherein the logistics task folder master data object represents the local work organization on the shop floor;

a service issue category catalog master data object, wherein the service issue category catalog master data object represents a structured directory of issue categories that describe business transactions in customer service from an objective or subjective point of view;

a packing bill of material master data object, wherein the packing bill of material master data object represents a complete and structured list of components that defines the packing structure of logistic units;

an identified stock master data object; and a key performance indicator master data object.

2. The system of claim 1, wherein the business objects further comprise:

a material sales process control transformed object, wherein the material sales process control transformed object represents a material, needed to control processes in presales, sales, and customer service;

a material inventory process control transformed object, wherein the material inventory process control transformed object represents the control features for a material that are used in several logistics processes, especially for inventory management;

a material availability confirmation process control transformed object, wherein the material availability confirmation process control transformed object represents the control features for a material and are used when executing the availability check;

a material procurement process control transformed object, wherein the material procurement process control transformed object represents a material that is required to use the material in procurement-relevant processes;

a material delivery process control transformed object, wherein the material delivery process control transformed object represents the control features for a material required by the delivery processes in a distribution center;

a material financials process control transformed object, wherein the material financials process control transformed object represents parameters to control processes in financials applied to a material;

a service product sales process control transformed object, wherein the service product sales process control transformed object represents a service product, needed to control processes in presales, sales, and customer service;

a service product procurement process control transformed object, wherein the service product procurement process control transformed object represents about a service product that is required to use the service product in procurement-relevant processes;

a material supply planning process control transformed object, wherein the material supply planning process control transformed object represents the control features for a material that are required to control procurement planning;

a warranty service process control transformed object, wherein the warranty service process control transformed object represents a warranty needed to control processes in customer service;

an individual material sales process control transformed object, wherein the individual material sales process control transformed object represents an individual material, needed to control processes in presales, sales, and customer service;

a business document flow transformed object, wherein the business document flow transformed object represents a view on the flow of business transaction documents;

a task business process object, wherein the task business process object represents a piece of daily business work or a notification about a business event;

a phone call activity business process object, wherein the phone call activity business process object represents a type of activity that records telephone interactions that are undertaken by employees on behalf of their company;

a letter activity business process object, wherein the letter activity business process object represents a type of activity that records messages written on paper by employees on behalf of their company;

an appointment activity business process object, wherein the appointment activity business process object represents different types of planned activities that are maintained in an employee's calendar, including external appointments and scheduled meetings with other business parties;

an email activity business process object, wherein the email activity business process object represents a type of activity that records messages written on paper by employees on behalf of their company;

a fax activity process business object, wherein the fax activity process business object represents a type of activity that records documents or graphics transmitted over a telecommunications facility by employees on behalf of their company;

an activity transformed object, wherein the activity transformed object represents an activity that can be performed by employees on behalf of their company;

a sourcing list transformed object, wherein the sourcing list transformed object represents supply arrangements and supply sources;

a software problem report business process object, wherein the software problem report business process object represents a report about a computer software incident;

a price and tax calculation dependent object, wherein the price and tax calculation dependent object represents the summarization of the determined and calculated price and tax elements of a business case;

a price calculation dependent object, wherein the price calculation dependent object represents the summarization of the determined and calculated price elements of a business case;

a tax calculation dependent object, wherein the tax calculation dependent object represents the summarization of the determined and calculated tax elements of a business case;

a price specification dependent object, wherein the price specification dependent object represents the specification of a price, discount or surcharge to be used in procurement documents;

an engineering change order business process object, wherein the engineering change order business process object represents an object that controls the alteration of different objects over time and their usage by means of other parameters;

a used address transformed object, wherein the used address transformed object represents the address data used in a business transaction;

a supply planning exception view transformed object, wherein the supply planning exception view transformed object represents an unsolved or incorrect planning situation;

an incident context dependent object, wherein the incident context dependent object represents structured information about the status of the source system where an incident is reported;

a payment explanation dependent object, wherein the payment explanation dependent object represents the explanation of a payment amount with regard to one or more business documents an accounting coding block distribution dependent object, wherein the accounting coding block distribution dependent object represents the distribution of coding blocks to enterprise resources changes, such as expenses or material movements;

a financial audit trail documentation dependent object, wherein the financial audit trail documentation dependent object represents the uniform documentation of a business transaction in terms of an operational component;

an address dependent object, wherein the address dependent object represents the data that describes the addressee, postal address and communication connections;

a storage control dependent object, wherein the storage control dependent object represents the data that describes addressee, postal address and communication connections;

a payment control dependent object, wherein the payment control dependent object represents a storage related behavior scheme that specifies storage state, set of rules, and required actions;

a market segment dependent object, wherein the market segment dependent object represents a homogeneous submarket of the total market;

it contains characteristics of customer, product, region, and organizational classification;

a cash discount terms dependent object, wherein the cash discount terms dependent object represents the modalities agreed upon between business partners for the payment of goods delivered or services provided;

an attachment folder dependent object, wherein the attachment folder dependent object represents a collection of all related documents for an arbitrary business object node;

a text collection dependent object, wherein the text collection dependent object represents a set of all multilingual textual descriptions, including formatting information, for a business object or a part of a business object;

a party business process object;

a change document business process object;

an output request business process object;

a product requirement specification business process object; a controlled output request transformed object; and a customer value added tax exemption arrangement business process object.

3. The system of claim 1, wherein the foundation layer comprises process components, the process components comprising:

a business partner data processing process component, an organizational management process component, a product data processing process component, a resource data processing process component, a location data processing process component, a logistics storage data processing process component, an inspection master data processing process component, a business document flow processing process component, a document management process component, a production model processing process component, a site logistics model processing process component, an activity management process component, a source of supply determination process component, a software problem reporting process component, an installed base data processing process component, a price master data management process component, an identity management process component, a pricing engine process component, an engineering change processing process component, a financial market data management process component, a date and time process component, a currency conversion process component, a quantity conversion process component, a payment card authorization process component, a payment authorization process component, and a document flow processing process component;

wherein:

the business partner data processing process component includes the business partner master data object, the employee master data object, the clearing house master data object, the payment card master data object, the customer master data object, the supplier master data object, the tax authority master data object, the house bank master data object, the sales arrangement master data object, the procurement arrangement master data object, the company tax arrangement master data object, the payment agreement master data object, and the party transformed object;

the organizational management process component includes the organizational center master data object, the position master data object, the cost center master data object, the reporting line unit master data object, the company master data object, the production center master data object, the distribution center master data object, the permanent establishment master data object, the sales unit master data object, the purchasing unit master data object, the service unit master data object, the profit center master data object, the segment master data object, and the program master data object;

the product data processing process component includes the material master data object, the material sales process control transformed object, the material inventory process control transformed object, the material availability confirmation process control transformed object, the service product master data object, the material procurement process control transformed object, the material delivery process control transformed object, the material financials process control transformed object, the warranty master data object, the service product sales process control transformed object, the service product procurement process control transformed object, the material supply planning process control transformed object, the individual material master data object, the product category hierarchy master data object, the warranty service process control transformed object, and the individual material sales process control transformed object;

the resource data processing process component includes the equipment resource master data object, the vehicle resource master data object, the labor resource master data object, the resource group master data object, and the capacity aggregation group master data object;

the location data processing process component includes the location master data object, the transportation zone master data object, the transportation lane master data object, and the supply planning area master data object;

the logistics storage data processing process component includes the logistics area master data object, the source and destination determination rule master data object, and the storage behavior method master data object;

the inspection master data processing process component includes the quality issue category catalog master data object, the sample drawing procedure master data object, and the inspection rule master data object;

the business document flow processing process component includes the business document flow transformed object;

the document management process component includes the document master data object;

the production model processing process component includes the production model master data object, the production bill of material master data object, the production bill of operations master data object, the released planning production model master data object, the released execution production model master data object, and the production segment master data object;

the site logistics model processing process component includes the site logistics bill of operations master data object, the site logistics process segment master data object, the site logistics process model master data object, and the released site logistics process model master data object;

the activity management process component includes the task business process object, the phone call activity business process object, the letter activity business process object, the appointment activity business process object, the email activity business process object, the fax activity process business object, and the activity transformed object;

the source of supply determination process component includes the supply quota arrangement master data object, the source of supply master data object, and the sourcing list transformed object;

the software problem reporting process component includes the software problem report business process object;

the installed base data processing process component includes the installed base master data object and the installation point master data object;

the price master data management process component includes the sales price specification master data object, the sales price list master data object and the procurement price specification master data object;

the identity management process component includes the identity master data object;

the pricing engine process component includes the price and tax calculation dependent object, the price calculation dependent object, the tax calculation dependent object, and the price specification dependent object;

the engineering change processing process component includes the engineering change order business process object; and the financial market data management process component includes the exchange rate master data object and the bank directory entry master data object.

4. The system of claim 1, wherein:
the computer system comprises multiple hardware platforms that are distinct and separate from each other; and
the foundation layer is separately deployed in its entirety on each of the multiple hardware platforms.

5. The system of claim 1, wherein:
the computer system comprises a first hardware platform and a second hardware platform that are distinct and separate from each other;
the foundation layer is separately deployed in its entirety on each of the first and the second hardware platforms;
also deployed on the first hardware platform is first application software implemented in one or more first deployment units; and
also deployed on the second hardware platform is second application software implemented in one or more second deployment units, the second deployment units being distinct and separate from the first deployment units.

6. The system of claim 5, wherein:
the one or more first deployment units comprise a first plurality of business objects and the one or more second deployment units comprise a second plurality of business objects; and
the first plurality of business objects and the second plurality of business objects have no business objects in common.

7. The system of claim 1, further comprising:
a repository of resource descriptions, the repository including a standards-based description of business objects in the foundation layer.

8. A non-transitory computer readable medium encoded with executable instructions which, when executed by at least one processor, cause the at least one processor to perform operations comprising:
storing an instance of a foundation layer for a services architecture design for implementing services-based applications in an enterprise application on a computer system, the foundation layer used to support application software deployed in an application layer in the computer system, where the application software includes at least one deployment unit in the application layer, where each deployment unit includes one or more process components deployed together in a single computer system, each deployment unit defining the limits of an application-defined transaction for performing application-relevant operations, where multiple instances of a single deployment unit can be deployed on separate physical computer systems, and wherein instances of the foundation layer are operable to be deployed on each of multiple computer systems that are distinct and separate from each other to support the application software deployed as the instances of one or more deployment units distributed on the multiple computer systems without duplication of instances of the deployment units in a single computer system, and wherein the instance of the foundation layer deployed on a particular computer system contains a set of fundamental entities used by the at least one deployment unit deployed on the particular computer system, and wherein the instances of the at least one deployment units deployed on the particular computer system communicate directly with the entities in the instance of the foundation layer deployed on the particular computer system, the instance of the foundation layer including a plurality of master business objects, the master data objects comprising:

a business partner master data object, wherein the business partner master data object represents a person, organization or group of persons in which a company has a business interest;
an employee master data object, wherein the employee master data object represents a person who contributes or has contributed to the creation of goods or services for a company;
a clearing house master data object, wherein the clearing house master data object represents an organization which provides the services concerning credit card payments;
a payment card master data object, wherein the payment card master data object represents a payment medium;
a customer master data object, wherein the customer master data object represents a business partner with whom a business relationship exists;
a supplier master data object, wherein the supplier master data object represents a business partner who provides materials and/or services;
a tax authority master data object, wherein the tax authority master data object represents a business partner for value added tax declaration;
a house bank master data object, wherein the house bank master data object represents a business partner providing services for our company, such as account management or lock box;
a sales arrangement master data object, wherein the sales arrangement master data object represents an arrangement that is made by a sales unit for a customer, and is used for sales transactions;
a procurement arrangement master data object, wherein the procurement arrangement master data object represents an arrangement that is made by a purchasing unit for a supplier, and is used for procurement transactions;
a company tax arrangement master data object, wherein the company tax arrangement master data object represents a contractual arrangement based on the agreement between a company and a tax authority for a tax type;
a payment agreement master data object, wherein the payment agreement master data object represents the agreement between a company and a business partner concerning the handling of incoming and outgoing payments;
an organizational center master data object, wherein the organizational center master data object represents a building block of the enterprise model which represents a node in an organizational structure of the extended enterprise;
a position master data object, wherein the position master data object represents an object of the enterprise model representing a specific post in an enterprise that can be occupied by holders and is therefore a placeholder for persons in an organizational structure;
a cost center master data object, wherein the cost center master data object represents an organizational unit that represents a defined location of cost incurrence and for which costs are recorded separately;
a reporting line unit master data object, wherein the reporting line unit master data object represents the organizational unit in the personnel reporting line of the enterprise;

a company master data object, wherein the company master data object represents a financially and legally independent, locally unbound entity registered under business law;

a production center master data object, wherein the production center master data object represents an organizational unit that is responsible for organizing and executing the delivery processes as well as the processes in site logistics;

a distribution center master data object, wherein the distribution center master data object represents an organizational unit that is responsible for organizing and executing the processes in production;

a permanent establishment master data object, wherein the permanent establishment master data object represents an organizational unit that represents a localized subdivision of a company whose business activities are subject to uniform fiscal treatment;

a sales unit master data object, wherein the sales unit master data object represents responsible for planning, realizing and administering of sales force processes;

a purchasing unit master data object, wherein the purchasing unit master data object represents an organizational unit responsible for strategic and operational purchasing;

a service unit master data object, wherein the service unit master data object represents the organizational unit responsible for processes covering all aspects of a customer service and a support center's business;

a profit center master data object, wherein the profit center master data object represents an organizational section of the enterprise for which a separate period result is determined and used for profit-oriented rating or control of the section activities;

a segment master data object, wherein the segment master data object represents a business branch of a company for which a closing statement is to be created based on the segment reporting regulations within the context of the particular accounting principle;

a program master data object, wherein the program master data object represents an organizational unit that represents a complex temporary undertaking to achieve subordinate objectives within one overall strategy;

a material master data object, wherein the material master data object represents a tangible product such as a sellable article, packaging, auxiliary material or expendable supplies;

a service product master data object, wherein the service product master data object represents an intangible product such as consulting and hotline service;

a warranty master data object, wherein the warranty master data object represents an intangible product such as a warranty for electronic devices and machinery;

an individual material master data object, wherein the individual material master data object represents a tangible product;

a product category hierarchy master data object, wherein the product category hierarchy master data object represents a hierarchy for structuring product categories;

an equipment resource master data object, wherein the equipment resource master data object represents a permanently installed operating facility or a group of identical operating facilities providing capacity to perform specific services;

a vehicle resource master data object, wherein the vehicle resource master data object represents a means of transportation or a group of identical means of transportation providing capacity to perform transportation services;

a labor resource master data object, wherein the labor resource master data object represents an employee or a group of employees with the same skills and qualifications that provides capacity to operate specific devices or to perform specific tasks;

a resource group master data object, wherein the resource group master data object represents a grouping of individual resources that provide similar services or have similar physical and functional characteristics;

a capacity aggregation group master data object, wherein the capacity aggregation group master data object represents the total of the capacities of several resources that provide identical services and can be used for logistics or production planning and scheduling purposes;

a location master data object, wherein the location master data object represents a geographical place used, for example, for communication of place information in business processes;

a transportation zone master data object, wherein the transportation zone master data object represents geographical locations that may be considered collectively for modeling or planning transportation routes or transportations;

a transportation lane master data object, wherein the transportation lane master data object represents a connection between two locations in a supply chain model used for planning cross-location product movements;

a supply planning area master data object, wherein the supply planning area master data object represents groups of requirements, stocks and other requirements coverage elements with the purpose of being together taken into account in net requirements calculation of supply planning;

a logistics area master data object, wherein the logistics area master data object represents an object that describes the internal structure of a logistics;

a source and destination determination rule master data object, wherein the source and destination determination rule master data object represents a rule to determine the search method for locating the source for stock retrieval or the destination for stock storage;

a storage behavior method master data object, wherein the storage behavior method master data object represents a set of rules distinguished by the manner in which a logistics area or resource is managed;

a quality issue category catalog master data object, wherein the quality issue category catalog master data object represents a catalogue of quality issues for the rating of different aspects of quality management;

a sample drawing procedure master data object, wherein the sample drawing procedure master data object represents how samples are taken for an inspection, such as the number, quantity, and subcategory of samples;

an inspection rule master data object, wherein the inspection rule master data object represents how an inspection of a given object must be performed;

a document master data object, wherein the document master data object represents a carrier of electronic information, including control and monitoring information;

a production model master data object, wherein the production model master data object represents a model of a production process in a production center that is specified by a network of production segments;

a production bill of material master data object, wherein the production bill of material master data object represents a complete, structured list of the components that make up a product or a family of similar products;

a production bill of operations master data object, wherein the production bill of operations master data object represents a detailed description of how a product is to be produced;

a released planning production model master data object, wherein the released planning production model master data object represents a released version of a production model in a production center that contains all details from the production bill of operations and production bill of material necessary for the planning of a production process;

a released execution production model master data object, wherein the released execution production model master data object represents a released version of a production model in a production center that contains all details from the production bill of operations and production bill of material necessary for the execution of a production process;

a production segment master data object, wherein the production segment master data object represents part of a production process in a production center specified by a network of operations and assigned materials for the production of a material;

a site logistics bill of operations master data object, wherein the site logistics bill of operations master data object represents a detailed description of how a product is to be moved, packed and otherwise dealt with during site logistics processing;

a site logistics process segment master data object, wherein the site logistics process segment master data object represents a set of operations for moving, packing or checking stock in a logistics division, which specifies a segment of a site logistics process;

a site logistics process model master data object, wherein the site logistics process model master data object represents a model that defines a logistic process managed by a logistics division, by specifying a sequence of process segments;

a released site logistics process model master data object, wherein the released site logistics process model master data object represents a structure that defines a logistic process in a logistics division by specifying a sequence of process segments;

a supply quota arrangement master data object, wherein the supply quota arrangement master data object represents a distribution of material requirements or goods to different sources of supply, business partners, or organizational units within one's own company;

a source of supply master data object, wherein the source of supply master data object represents an object that describes a logical link between a possible source of products and a possible target;

an installed base master data object, wherein the installed base master data object represents a container that holds structured information of business components and their compositions, as well as their business features;

an installation point master data object, wherein the installation point master data object represents the time-dependent assignment of a business component to installed bases;

a sales price specification master data object, wherein the sales price specification master data object represents the specification of a price, discount or surcharge to be used in sales and service documents;

a sales price list master data object, wherein the sales price list master data object represents a list of price specifications with respect to common identifying criteria;

a procurement price specification master data object, wherein the procurement price specification master data object represents the specification of a price, discount or surcharge to be used in procurement documents;

an identity master data object, wherein the identity master data object represents a set of attributes identifying a person together with all of his user accounts in a system landscape;

an exchange rate master data object, wherein the exchange rate master data object represents the relative value of two different currencies for a time span;

a bank directory entry master data object, wherein the bank directory entry master data object represents a bank or institution capable of performing financial transactions;

a logistic unit master data object, wherein the logistic unit master data object represents an object that represents an item of any composition, which is used for storage, movement, and packing;

a logistic unit usage master data object, wherein the logistic unit usage master data object represents an object that represents a logistics purpose for which logistic units are grouped;

a logistics task folder master data object, wherein the logistics task folder master data object represents the local work organization on the shop floor;

a service issue category catalog master data object, wherein the service issue category catalog master data object represents a structured directory of issue categories that describe business transactions in customer service from an objective or subjective point of view;

a packing bill of material master data object, wherein the packing bill of material master data object represents a complete and structured list of components that defines the packing structure of logistic units;

an identified stock master data object; and a key performance indicator master data object; and using the instance of the foundation layer in the particular computer system to support execution of one or more application-defined transactions associated with the instances of the at least one deployment unit deployed on the particular computer system, where supporting the execution of the one or more application-defined transactions includes directly communicating with the instances of the at least one deployment units deployed on the particular computer system associated with the one or more application-defined transactions.

9. The product of claim 8, wherein the foundation layer further comprises business objects comprising:

a material sales process control transformed object, wherein the material sales process control transformed object represents a material, needed to control processes in presales, sales, and customer service;

a material inventory process control transformed object, wherein the material inventory process control transformed object represents the control features for a material that are used in several logistics processes, especially for inventory management;

a material availability confirmation process control transformed object, wherein the material availability confirmation process control transformed object represents the control features for a material and are used when executing the availability check;

a material procurement process control transformed object, wherein the material procurement process control transformed object represents a material that is required to use the material in procurement-relevant processes;

a material delivery process control transformed object, wherein the material delivery process control transformed object represents the control features for a material required by the delivery processes in a distribution center;

a material financials process control transformed object, wherein the material financials process control transformed object represents parameters to control processes in financials applied to a material;

a service product sales process control transformed object, wherein the service product sales process control transformed object represents a service product, needed to control processes in presales, sales, and customer service;

a service product procurement process control transformed object, wherein the service product procurement process control transformed object represents about a service product that is required to use the service product in procurement-relevant processes;

a material supply planning process control transformed object, wherein the material supply planning process control transformed object represents the control features for a material that are required to control procurement planning;

a warranty service process control transformed object, wherein the warranty service process control transformed object represents a warranty needed to control processes in customer service;

an individual material sales process control transformed object, wherein the individual material sales process control transformed object represents an individual material, needed to control processes in presales, sales, and customer service;

a business document flow transformed object, wherein the business document flow transformed object represents a view on the flow of business transaction documents;

a task business process object, wherein the task business process object represents a piece of daily business work or a notification about a business event;

a phone call activity business process object, wherein the phone call activity business process object represents a type of activity that records telephone interactions that are undertaken by employees on behalf of their company;

a letter activity business process object, wherein the letter activity business process object represents a type of activity that records messages written on paper by employees on behalf of their company;

an appointment activity business process object, wherein the appointment activity business process object represents different types of planned activities that are maintained in an employee's calendar, including external appointments and scheduled meetings with other business parties;

an email activity business process object, wherein the email activity business process object represents a type of activity that records messages written on paper by employees on behalf of their company;

a fax activity process business object, wherein the fax activity process business object represents a type of activity that records documents or graphics transmitted over a telecommunications facility by employees on behalf of their company;

an activity transformed object, wherein the activity transformed object represents an activity that can be performed by employees on behalf of their company;

a sourcing list transformed object, wherein the sourcing list transformed object represents supply arrangements and supply sources;

a software problem report business process object, wherein the software problem report business process object represents a report about a computer software incident;

a price and tax calculation dependent object, wherein the price and tax calculation dependent object represents the summarization of the determined and calculated price and tax elements of a business case;

a price calculation dependent object, wherein the price calculation dependent object represents the summarization of the determined and calculated price elements of a business case;

a tax calculation dependent object, wherein the tax calculation dependent object represents the summarization of the determined and calculated tax elements of a business case;

a price specification dependent object, wherein the price specification dependent object represents the specification of a price, discount or surcharge to be used in procurement documents;

an engineering change order business process object, wherein the engineering change order business process object represents an object that controls the alteration of different objects over time and their usage by means of other parameters;

a used address transformed object, wherein the used address transformed object represents the address data used in a business transaction;

a supply planning exception view transformed object, wherein the supply planning exception view transformed object represents an unsolved or incorrect planning situation;

an incident context dependent object, wherein the incident context dependent object represents structured information about the status of the source system where an incident is reported;

a payment explanation dependent object, wherein the payment explanation dependent object represents the explanation of a payment amount with regard to one or more business documents an accounting coding block distribution dependent object, wherein the accounting coding block distribution dependent object represents the distribution of coding blocks to enterprise resources changes, such as expenses or material movements;

a financial audit trail documentation dependent object, wherein the financial audit trail documentation dependent object represents the uniform documentation of a business transaction in terms of an operational component;

an address dependent object, wherein the address dependent object represents the data that describes the addressee, postal address and communication connections;

a storage control dependent object, wherein the storage control dependent object represents the data that describes addressee, postal address and communication connections;

a payment control dependent object, wherein the payment control dependent object represents a storage related behavior scheme that specifies storage state, set of rules, and required actions;

a market segment dependent object, wherein the market segment dependent object represents a homogeneous submarket of the total market;

it contains characteristics of customer, product, region, and organizational classification;

a cash discount terms dependent object, wherein the cash discount terms dependent object represents the modalities agreed upon between business partners for the payment of goods delivered or services provided;

an attachment folder dependent object, wherein the attachment folder dependent object represents a collection of all related documents for an arbitrary business object node;

a text collection dependent object, wherein the text collection dependent object represents a set of all multilingual textual descriptions, including formatting information, for a business object or a part of a business object;

a party business process object;

a change document business process object; an output request business process object;

a product requirement specification business process object;

a controlled output request transformed object; and a customer value added tax exemption arrangement business process object.

10. The product of claim 8, wherein the foundation layer comprises process components, the process components comprising:

a business partner data processing process component, an organizational management process component, a product data processing process component, a resource data processing process component, a location data processing process component, a logistics storage data processing process component, an inspection master data processing process component, a business document flow processing process component, a document management process component, a production model processing process component, a site logistics model processing process component, an activity management process component, a source of supply determination process component, a software problem reporting process component, an installed base data processing process component, a price master data management process component, an identity management process component, a pricing engine process component, an engineering change processing process component, a financial market data management process component, a date and time process component, a currency conversion process component, a quantity conversion process component, a payment card authorization process component, a payment authorization process component, and a document flow processing process component; and wherein:

the business partner data processing process component includes the business partner master data object, the employee master data object, the clearing house master data object, the payment card master data object, the customer master data object, the supplier master data object, the tax authority master data object, the house bank master data object, the sales arrangement master data object, the procurement arrangement master data object, the company tax arrangement master data object, the payment agreement master data object, and the party transformed object;

the organizational management process component includes the organizational center master data object, the position master data object, the cost center master data object, the reporting line unit master data object, the company master data object, the production center master data object, the distribution center master data object, the permanent establishment master data object, the sales unit master data object, the purchasing unit master data object, the service unit master data object, the profit center master data object, the segment master data object, and the program master data object;

the product data processing process component includes the material master data object, the material sales process control transformed object, the material inventory process control transformed object, the material availability confirmation process control transformed object, the service product master data object, the material procurement process control transformed object, the material delivery process control transformed object, the material financials process control transformed object, the warranty master data object, the service product sales process control transformed object, the service product procurement process control transformed object, the material supply planning process control transformed object, the individual material master data object, the product category hierarchy master data object, the warranty service process control transformed object, and the individual material sales process control transformed object;

the resource data processing process component includes the equipment resource master data object, the vehicle resource master data object, the labor resource master data object, the resource group master data object, and the capacity aggregation group master data object;

the location data processing process component includes the location master data object, the transportation zone master data object, the transportation lane master data object, and the supply planning area master data object;

the logistics storage data processing process component includes the logistics area master data object, the source and destination determination rule master data object, and the storage behavior method master data object;

the inspection master data processing process component includes the quality issue category catalog master data object, the sample drawing procedure master data object, and the inspection rule master data object;

the business document flow processing process component includes the business document flow transformed object;

the document management process component includes the document master data object;

the production model processing process component includes the production model master data object, the production bill of material master data object, the production bill of operations master data object, the released planning production model master data object, the released execution production model master data object, and the production segment master data object;

the site logistics model processing process component includes the site logistics bill of operations master data object, the site logistics process segment master data object, the site logistics process model master data object, and the released site logistics process model master data object;

the activity management process component includes the task business process object, the phone call activity business process object, the letter activity business process object, the appointment activity business process object, the email activity business process object, the fax activity process business object, and the activity transformed object;

the source of supply determination process component includes the supply quota arrangement master data object, the source of supply master data object, and the sourcing list transformed object;

the software problem reporting process component includes the software problem report business process object;

the installed base data processing process component includes the installed base master data object and the installation point master data object;

the price master data management process component includes the sales price specification master data object, the sales price list master data object and the procurement price specification master data object;

the identity management process component includes the identity master data object;

the pricing engine process component includes the price and tax calculation dependent object, the price calculation dependent object, the tax calculation dependent object, and the price specification dependent object;

the engineering change processing process component includes the engineering change order business process object; and the financial market data management process component includes the exchange rate master data object and the bank directory entry master data object.

* * * * *